(12) United States Patent
Koppolu et al.

(10) Patent No.: US 6,401,099 B1
(45) Date of Patent: *Jun. 4, 2002

(54) ASYNCHRONOUS BINDING OF NAMED OBJECTS

(75) Inventors: Srinivasa R. Koppolu, Redmond; Johann Posch, Mercer Island; Victor Stone, Mercer Island; Antony S. Williams, Mercer Island, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/760,924

(22) Filed: Dec. 6, 1996

(51) Int. Cl.[7] ............................................. G06F 17/30
(52) U.S. Cl. ...................................... 707/103; 707/104
(58) Field of Search .................. 707/103, 104, 707/200; 395/200.06, 701, 703, 200, 500; 370/249

(56) References Cited

U.S. PATENT DOCUMENTS

| 4,514,800 A | 4/1985 | Gruner et al. ............... 364/200 |
| 4,674,040 A | 6/1987 | Barker et al. |
| 4,739,477 A | 4/1988 | Barker et al. |
| 4,815,029 A | 3/1989 | Barker et al. |
| 4,933,880 A | 6/1990 | Borgendale et al. |
| 4,962,475 A | 10/1990 | Hernandez et al. |
| 5,072,412 A | 12/1991 | Henderson, Jr. et al. |
| 5,187,786 A | 2/1993 | Densmore et al. |
| 5,191,645 A | 3/1993 | Carlucci et al. |

(List continued on next page.)

FOREIGN PATENT DOCUMENTS

JP     3191429     8/1991

OTHER PUBLICATIONS

Pike, Rob et al., "Unix –The Legend Evolves," *Plan 9 from Bell Labs, Proceedings of the Summer 1990 UKUUG Conference Jul. 9–13, 1990*, Royal Lancaster Hotel, London UK, ISBN: 0 9513181 7 9.

(List continued on next page.)

*Primary Examiner*—Frantz Coby
(74) *Attorney, Agent, or Firm*—Klarquist Sparkman, LLP

(57) ABSTRACT

An object-oriented framework unifies retrieval and browsing of data locally and from remote computer networks. The framework includes a class of monikers that operate on behalf of a client program to asynchronously bind or retrieve data referenced by a name without blocking execution of the client. This allows the client to provide responsive user interaction including when remotely retrieving data.

69 Claims, 9 Drawing Sheets

U.S. PATENT DOCUMENTS

| | | | |
|---|---|---|---|
| 5,204,947 A | 4/1993 | Bernstein et al. | |
| 5,206,951 A | 4/1993 | Khoyi | |
| 5,237,680 A | 8/1993 | Adams et al. | |
| 5,249,275 A | 9/1993 | Srivastava | |
| 5,274,803 A | 12/1993 | Dubin et al. | |
| 5,297,249 A | 3/1994 | Bernstein et al. | |
| 5,297,283 A | 3/1994 | Kelly, Jr. et al. | |
| 5,313,646 A | 5/1994 | Hendricks et al. | |
| 5,333,317 A | 7/1994 | Dann | 707/100 |
| 5,339,423 A | 8/1994 | Beitel et al. | |
| 5,339,424 A | 8/1994 | Fushimi | |
| 5,341,478 A | 8/1994 | Travis, Jr. et al. | |
| 5,369,766 A | 11/1994 | Nakano et al. | |
| 5,369,778 A | 11/1994 | San Soucie et al. | |
| 5,381,547 A | 1/1995 | Flug et al. | |
| 5,408,665 A | 4/1995 | Fitzgerald | |
| 5,410,688 A | 4/1995 | Willians et al. | |
| 5,440,744 A | 8/1995 | Jacobson et al. | |
| 5,446,842 A | 8/1995 | Schaeffer et al. | |
| 5,459,865 A | 10/1995 | Heninger et al. | |
| 5,481,722 A | 1/1996 | Skinner | |
| 5,517,655 A | 5/1996 | Collins et al. | |
| 5,535,389 A | 7/1996 | Elder et al. | |
| 5,551,035 A | 8/1996 | Arnold et al. | |
| 5,572,643 A | 11/1996 | Judson | |
| 5,577,252 A | 11/1996 | Nelson et al. | 395/670 |
| 5,581,686 A | 12/1996 | Koppolu et al. | |
| 5,634,121 A | 5/1997 | Tracz et al. | |
| 5,659,729 A | 8/1997 | Nielsen | |
| 5,664,178 A | 9/1997 | Sinofsky | |
| 5,706,501 A | 1/1998 | Horikiri et al. | 707/10 |
| 5,745,683 A | 4/1998 | Lee et al. | 395/200.8 |
| 5,758,358 A | 5/1998 | Ebbo | |
| 5,761,683 A | 6/1998 | Logan et al. | |
| 5,764,984 A | 6/1998 | Loucks | 395/682 |
| 5,778,372 A | 7/1998 | Cordell et al. | |
| 5,815,830 A | 9/1998 | Anthony | |
| 5,838,906 A | 11/1998 | Doyle et al. | |
| 5,842,018 A | 11/1998 | Atkinson et al. | |
| 5,854,630 A | 12/1998 | Nielsen | |
| 5,963,964 A | 10/1999 | Nielsen | |
| 6,016,520 A | 1/2000 | Facq et al. | |
| 6,026,416 A | 2/2000 | Kanerva et al. | |
| 6,031,989 A | 2/2000 | Cordell | |

OTHER PUBLICATIONS

Peterson, Baird, "Unix Variants," *Unix Review*, 10(4):29–31, Apr. 1992.

Pike, Rob et al., "The Use of Name Spaces in Plan 9, " *Operating Systems Review*, 27(2):72–76, Apr. 1993, ISSN:0163–5980.

"NeXTSTEP General Reference, Vol. 1 ," *NeXT Publications*, Addison–Wesley Publishing Co., 1992, pp. 1–3 to 1–37, 2–5 to 2–16, 2–390 to 2–419, 2–503 to 2–507, 2–895 to 2–896, 2–986 to 2–987, 2–1045 to 2–1046.

Clapp, Doug, "The NeXT Application Kit, Part I: Non–Responsive Classes," *The NeXT Bible*, Brady Books, N.Y., 1990, pp. 275–280.

Zdonik, Stanley B., "Object Management System Concepts," *Association for Computing Machinery*, ACM #ACM 0–89791–140–7/84/006/0013, 1984.

Zdonik, Stanley Benjamin, Jr., "Object Management System Concepts: Supporting Integrated Office Workstation Application,"Doctoral Thesis *Massachusetts Institute of Technology*, 1983.

Wolfgang, Herzner et al., "CDAM –Compound Doument Access and Managment. An Object–Oriented Approach," Multimedia, Systems, Interaction and Applications, *Eurographics Workshop*, Apr. 1991, Stockholm, Sweden, pp. 17–36.

Kobayashi, Masaaki et al., "An Update on BTRON–specification OS Development," *IEEE Proceedings of the 8th Tron Project Symposium*, Cat. Nr. 91TH0412–7, Nov. 1991, Tokyo, Japan, pp. 132–140.

IBM, "Creating In–Line Objects Within an Integrated Editing Environment," *IBM Technical Disclosure Bulletin*, 27(5):2962, Oct. 1984.

DiLascia, Paul et al., "Sweeper," *Microsoft Interactive Developer*vol. 1, No. 1, Spring 1996, pp. 16–52.

Brown, Mark R., "Using Netscape 2," pp. 162–163, 148–156, 718–719, 1993.

Mills Elinor, "Navigator 'Cookies' Files Will Monitor Web User Activity," Feb.2, 1996.

Berg, Al, "Cookies Nibble at Your Disk Drive,"0 Jul. 8, 1996.

Trupin, J., "The Visual Programmer Puts ActiveX Document Objects Through Their Paces," *Systems Journal*, Jun. 1996.

"Getting Results With Microsoft Office for Windows 95,"pp. 109–112, Microsoft Corporation, 1996.

U.S. Patent Application No. 08/761,709 filed December 6, 1996, Koppolu et al.

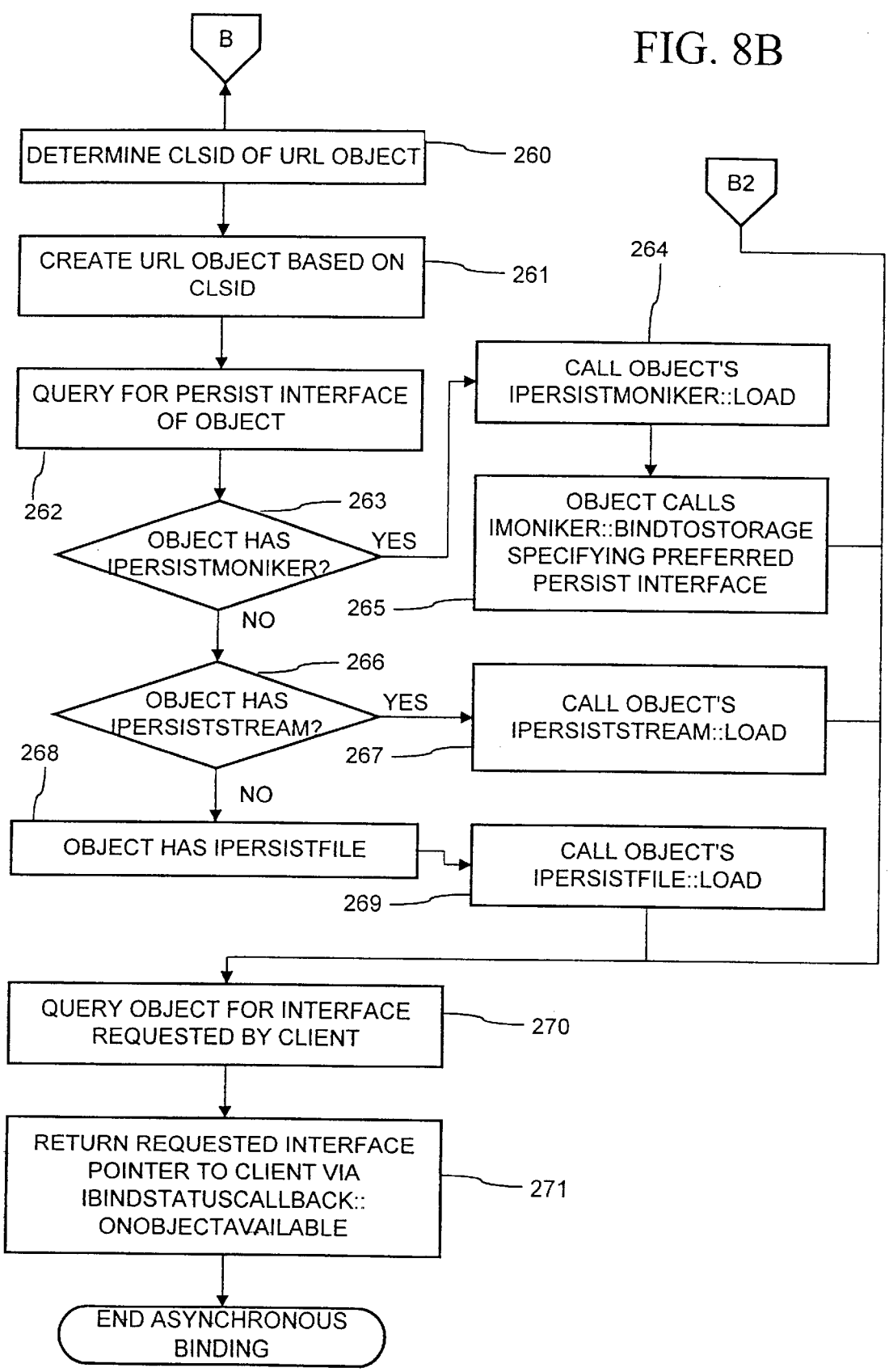

ASYNCHRONOUS BINDING OF NAMED OBJECTS

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to uniformly navigating or browsing data from a variety of sources, and more particularly relates to methods and systems for referencing and retrieving data stored in a computer.

BACKGROUND AND SUMMARY OF THE INVENTION

Previous techniques and mechanisms for navigating to and retrieving data in a computer system have had significant drawbacks which pose obstacles to providing unified tools for browsing data seamlessly and transparently from all sources (including local storage and remote networks).

Microsoft Corporation's Object Linking and Embedding (OLE) component software technology provides a technique for referencing and retrieving data in a computer system which uses small objects referred to as monikers. An OLE object is a software component that may encapsulate both code (i.e., functions or procedures comprising a sequence of program instructions) and data, and exposes its functionality (i.e., the code) to other programs and objects (referred to as "clients") through interfaces. An interface is a named set of logically related functions. Each object is an instance of an object type (referred to as a "class") which defines the structure of interfaces that its objects support.

A moniker operates as a name for another object. It encapsulates the name of the object together with functions for retrieving the named object through a process referred to in OLE as "binding." The binding process resolves or dereferences a name of an object into a link or pointer to the particular named object (which for OLE purposes is a pointer to an interface of the named object including loading the object from persistent storage, if needed). Thus, binding can be defined as a process of retrieving and linking to an object referenced by a name.

The object named by a moniker can encapsulate any desired data. The name, for example, can be a file name of data stored as a file on a computer's hard drive or on a shared network drive. The name can even be a uniform resource locator (URL) identifying a document or other data residing on the Internet. Further, the binding function in the moniker contains the code to perform all the steps necessary to bind to the data, including finding the code associated with the particular data referenced by the name, instantiating an object to encapsulate the data with its associated code, and loading the data from its storage source into the object. Thus, a client program can access any data from any source using a moniker that names that data, including a document stored as a file on a computer's hard drive, a particular piece of a document (such as a particular cell of a spreadsheet), or even data from remote sources such as the Internet or on-line services.

OLE monikers have the advantage that the code for retrieving data resides outside the client program in the moniker. The logic necessary to access different data therefore need not be hard coded into the client program. Instead, the client need only include the code for interacting with monikers for the named objects. Further, each moniker exposes its binding function to clients through an interface. All monikers support a common interface structure defined by the monikers' class. Since all monikers support the same interface, a client can interact with any moniker in the same way using the same code. OLE monikers thus provide a general mechanism for a client program to access any variety of data from any source.

OLE monikers, however, have a drawback when used for retrieving data from a slow source. The time to retrieve data from some sources (particularly from the Internet and other remote sources) is very slow relative to human response time. (The Internet is a global network of cooperatively interconnected computer networks, consisting of millions of individual computers. A portion of the Internet referred to as the "world-wide web" consists of computers, also referred to as "sites," which make multi-media documents in hyper-text mark-up language (HTML) generally available for downloading or retrieval by individuals having a computer with Internet access.) A typical personal computer user connects to the Internet with a 28.8 kbaud or slower modem device. The typical document accessed from the world wide web portion of the Internet, on the other hand, is several tens of kbytes in size, and often incorporates one or more pictures which also may be tens of kbytes in size. At the data transfer rate of the typical modem connection, such typical data can take minutes to access from the Internet.

A drawback to using OLE monikers for retrieving data from such sources is that OLE monikers block. More specifically, when a client calls a moniker's binding function, the call does not return until the data retrieval completes. During this time, execution of the client program (including its user interface) halts. In effect, the client's user interface freezes and remains non-responsive to user input until the data access is complete. In the Microsoft Windows® operating system, this condition of the client program is indicated by changing the mouse cursor to an "hour glass" icon when the client has the "focus" (i.e., the cursor is positioned over the client's window). Since the client is blocked, it is unable to display a progress indicator (such as a "% complete" bar graph or "estimated time remaining" notification), or provide any control which the user can activate to cancel the data access. Since the client may remain non-responsive for a substantial time while accessing data with a moniker from a slow source, the user thus has no way of knowing whether the data is still being accessed or the client has "crashed" (i.e., become inoperative) due to some error. As a result, OLE monikers provide a low quality of service when used for retrieving data from slow sources.

A unified browsing environment is provided in the present invention by an object-oriented framework and system having objects, programming interfaces, object integration interfaces, and methods for supporting unified retrieval of data from different sources. The invention overcomes the limitation in previous monikers of blocking execution of the moniker's client, and thus provides source-transparent and responsive browsing.

According to one aspect of the invention, a computer programming platform includes monikers (referred to herein as "asynchronous monikers") which access data asynchronously. When a client calls the binding method of an asynchronous moniker, the asynchronous moniker returns control immediately to the client and completes the data access as a separately executing task or thread (sometimes referred to as "background processing"). Alternatively, the moniker retrieves data to storage with an asynchronous storage object which allows asynchronous access by the client to the data as it is retrieved to storage. Thus, even where the data is remotely accessed from a slow source, the client is able to maintain a responsive user interface, which prevents the perception of poor and non-uniform performance.

In the illustrated embodiment, the asynchronous moniker and the client provide interfaces through which they interact while the data access is performed. Through the client's interface, the asynchronous moniker provides notifications of the status of the data access to the client. The client thus is able to display a progress indicator. Also, the client can call functions through the interface of the asynchronous moniker to abort, suspend, or resume the data access.

The illustrated embodiment of the invention provides an asynchronous moniker (referred to herein as a "URL moniker") which references data with an Internet URL, and provides asynchronous access to the data for the client. The URL moniker has the capability of parsing the URL it contains, and utilizing an associated Internet transport protocol to access the data it names from the Internet. The programming platform includes an application programming interface which utilizes this parsing capability to provide an extensible service for creating a moniker which uses an appropriate transport protocol for a given data reference. The programming platform also provides object integration interfaces for the moniker's client to negotiate acceptable media types with the data source.

Additional features and advantages of the invention will be made apparent from the following detailed description of an illustrated embodiment which proceeds with reference to the accompanying drawings.

BRIEF DESCRIPTION OF THE DRAWINGS

FIGS. 8A–8B are flow charts illustrating an asynchronous binding process performed in the asynchronous moniker of FIG. 6 and URL moniker of FIG. 7.

DETAILED DESCRIPTION OF THE ILLUSTRATED EMBODIMENTS

Figure 1:
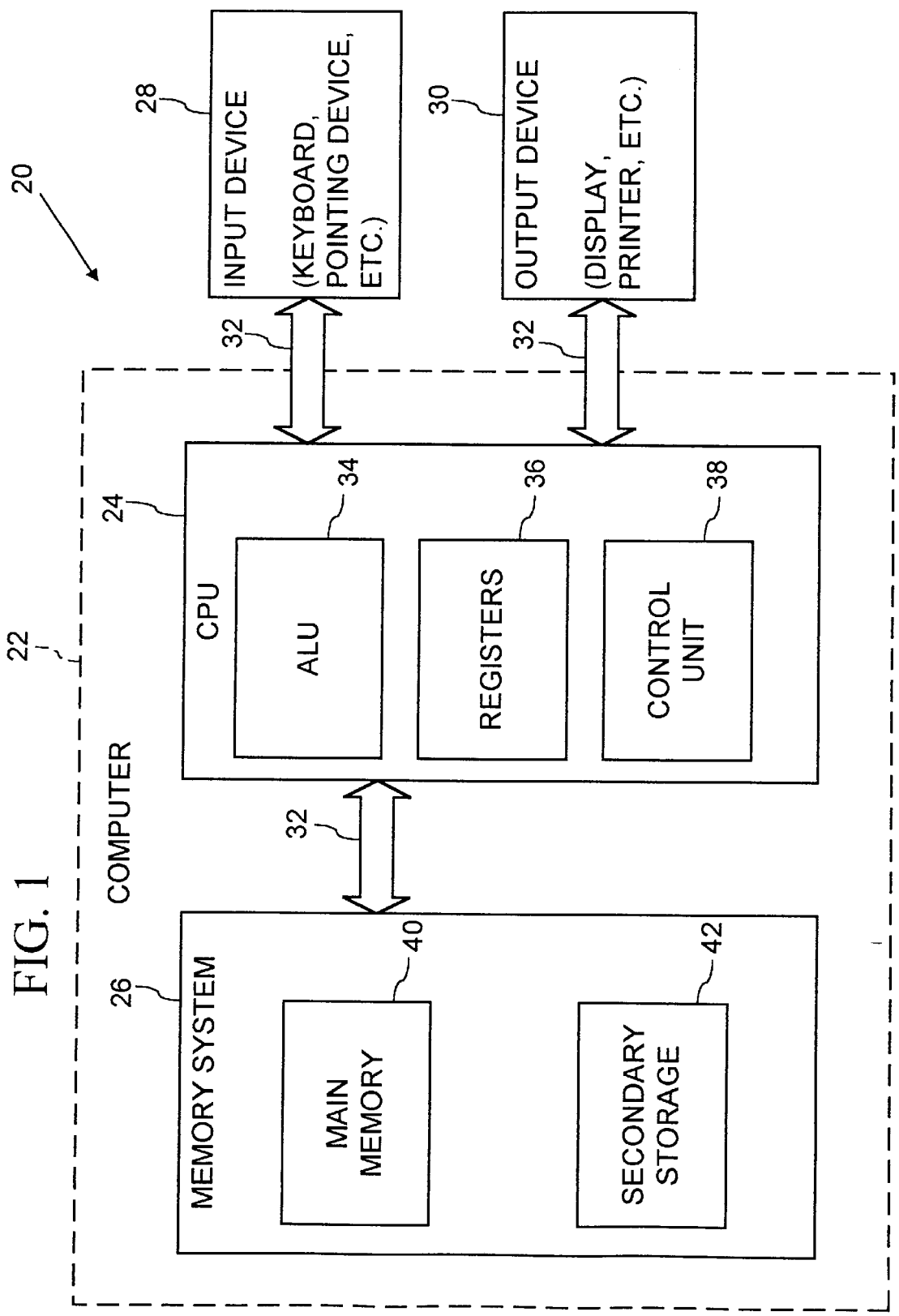
FIG. 1 is a block diagram of a computer system that may be used to implement a method and apparatus embodying the invention for unified browsing.

1. Browser Overview
2. Object Overview
3. OLE Server and Document Object Overview
4. Moniker Overview
5. Asynchronous Monikers
    5.1 Asynchronous and Synchronous Binding Selection
    5.2 Asynchronous and Synchronous Storage
    5.3 Data-pull and Data-push models
    5.4 The IBinding Interface
        5.4.1 The IBinding:Abort Function
        5.4.2 The IBinding::Suspend Function
        5.4.3 The IBinding::Resume Function
        5.4.4 The IBinding::SetPriority Function
        5.4.5 The IBinding::GetPriority Function
    5.5 The IBindStatusCallback Interface
        5.5.1 The BINDVERB Enumeration
        5.5.2 The BINDINFOF Enumeration
        5.5.3 The BINDINFO Structure
        5.5.4 The BSCO_OPTION Enumeration
        5.5.5 The BINDF Enumeration
        5.5.6 The BSCF Enumeration
        5.5.7 The BINDSTATUS Enumeration
        5.5.8 The IBindStatusCallback:: QueryInterf ace Function
        5.5.9 The IBindStatusCallback::GetBindInfo Function
        5.5.10 The IBindStatusCallback::OnStartBind ing Function
        5.5.11 The IBindStatusCallback: :GetPriority Function
        5.5.12 The IBindStatusCallback::OnProgress Function
        5.5.13 The IBindStatusCallback::OnDataAvai lable Function
        5.5.14 The IBindStatusCallback::OnObjectAv ailable Function
        5.5.15 The IBindStatusCallback::OnLowReso urce Function
        5.5.16 The IBindStatusCallback::OnStopBind ing Function
    5.6 The IPersistMoniker Interface
        5.6.1 The IPersistMoniker::IsDirty Function
        5.6.2 The IPersistMoniker::Load Function
        5.6.3 The IPersistMoniker::Save Function
        5.6.4 The IPersistMoniker::SaveCompleted
        5.6.5 The IPersistMoniker::GetCurMoniker Function
    5.7 API Functions for Asynchronous Monikers
        5.7.1 The CreateAsyncBindCtx API Function
        5.7.2 The RegisterBindStatusCallback API Function
        5.7.3 The RevokeBindStatusCallback API Function
        5.7.4 The IsAsyncMoniker API Function
6. URL Monikers
    6.1 Media-type Negotiation with the URL Moniker
        6.1.1 The RegisterMediaTypes API Function
        6.1.2 The CreateFormatEnumerator API Function
        6.1.3 The RegisterFormatEnumerator API Function
        6.1.4 The RevokeFormatEnumerator API Function
        6.1.5 The CreateURLMoniker API Function
    6.2 URL Moniker Functions
        6.2.1 The URL Moniker-IUnknown::QueryInterfa ce Function
        6.2.2 The URL Moniker-IPersist::GetClassID Function
        6.2.3 The URL Moniker-IPersistStream::IsDirty Function
        6.2.4 The URL Moniker-IPersistStream::Load Function
        6.2.5 The URL Moniker-IPersistStream::Save Function
        6.2.6 The URL Moniker-IPersistStream::GetSize Max Function
        6.2.7 The URL Moniker-IMoniker::BindToObject Function 6.2.8 The URL Moniker-IMoniker::BindToStorage Function
6.2.9 The URL Moniker-IMoniker::Reduce Function
6.2.10 The URL Moniker-IMoniker::ComposeWith Function
6.2.11 The URL Moniker-IMoniker::Enum Function
6.2.12 The URL Moniker-IMoniker::IsEqual Function
6.2.13 The URL Moniker-IMoniker::Hash Function
6.2.14 The URL Moniker-IMoniker::IsRunning Function
6.2.15 The URL Moniker-IMoniker::GetTimeOfLastChance Function
6.2.16 The URL Moniker-IMoniker::Inverse Function
6.2.17 The URL Moniker-IMoniker::CommonPrefixWith Function
6.2.18 The URL Moniker-IMoniker::RelativePathTo Function
6.2.19 The URL Moniker-IMoniker::GetDisplayName Function
6.2.20 The URL Moniker-IMoniker::ParseDisplayName Function
6.2.21 The URL Moniker-IMoniker::IsSystemMoniker Function
6.3 Client Extension Services
6.4 The IAuthenticate interface
6.5 The IHttpNegotiate Interface
   6.5.1 The IHttpNegotiate::BeginningTransaction Function
   6.5.2 The IHttpNegotiate::OnHeadersAvailable Function
   6.5.3 The IHttpNegotiate::OnError Function 1. Computer Overview Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

1. Browser Overview

Figure 2:
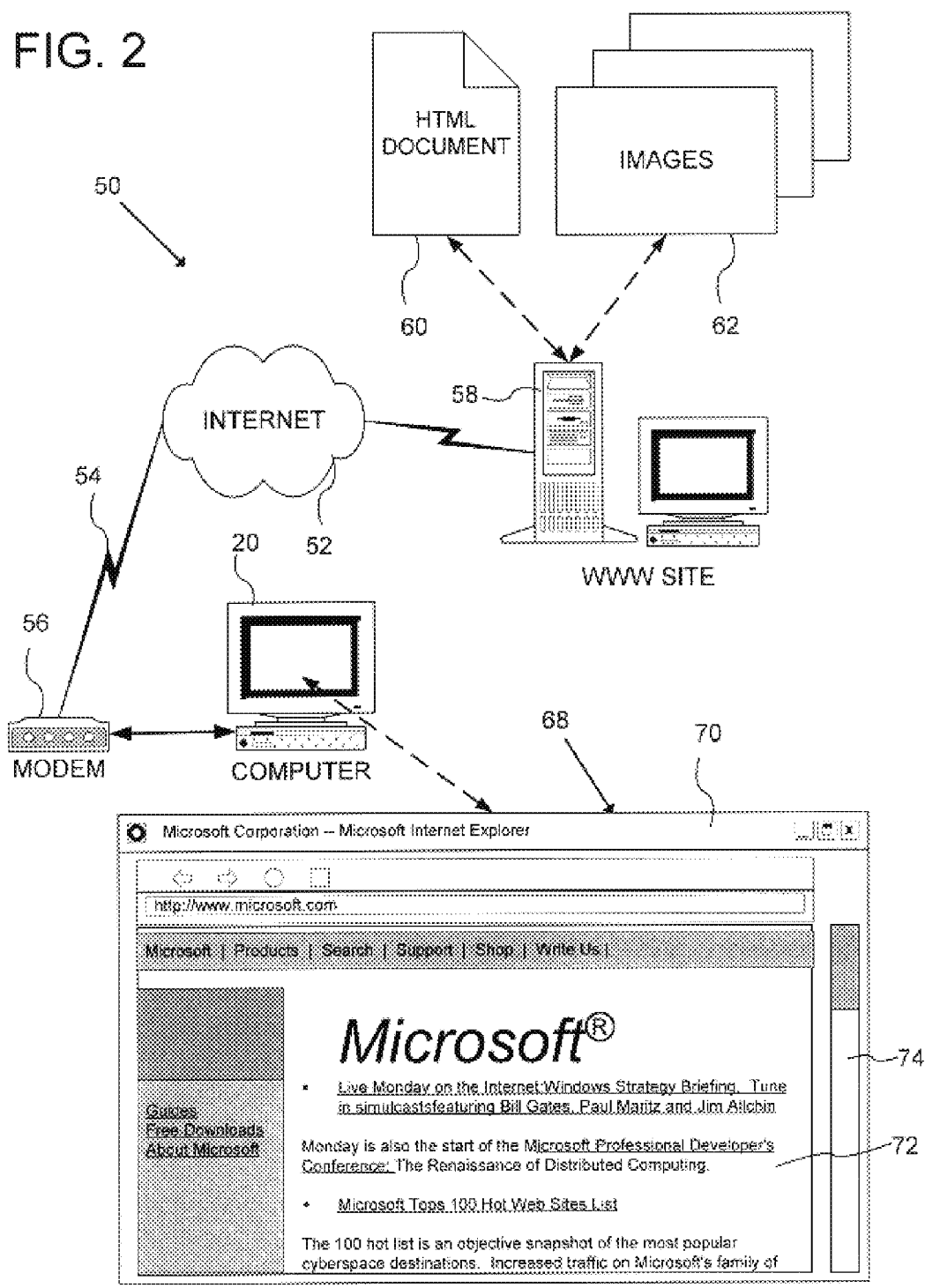
FIG. 2 is a diagram illustrating a browsing system including the computer of FIG. 1 for unified browsing according to an illustrated embodiment of the invention.

In a browsing environment 50 of an illustrated embodiment of the invention shown in FIG. 2, the computer 20 (also shown in FIG. 1) runs software, referred to herein as a "browser," for unified browsing of electronic documents and other data from local sources (e.g., the secondary storage 42 of FIG. 1) and from a remote computer network 52. The browser can be integrated with the operating system software, or can be a separate application software. The illustrated browser is implemented by the software as an OLE object (described below).

The illustrated remote computer network 52 is the Internet, which is described in the Background and Summary of the Invention above. In the illustrated browsing environment 50, the computer 20 connects to the computer network 52 over a telephone line 54 with a modem 56. Other physical connections to the computer network alternatively can be used, such as an ISDN, T1 or like high speed telephone line and modem, a television cable and modem, a satellite link, an optical fiber link, an Ethernet or other local area network technology wire and adapter card, radio or optical transmission devices, etc. The invention can alternatively be embodied in a browsing environment for other public or private computer networks, such as a computer network of a commercial on-line service or an internal corporate local area network (LAN), an intranet, or like computer network.

Documents for browsing with the illustrated browser can reside as files of a file system stored in the computer's secondary storage 42 (FIG. 1), or reside as resources at a remote computer 58 (also referred to as a "site") connected to the computer network 52, such as a world-wide web site on the Internet. The illustrated document 60 residing at the site 58 conforms with HTML standards, and may include extensions and enhancements of HTML standards. However, the illustrated browser also can browse documents having other data formats (e.g., Microsoft® Word documents, etc.) from the computer 20 or remote computer 58.

In conformance with HTML, the illustrated document 60 can incorporate other additional information content 62, such as images, audio, video, executable programs, etc. (hereafter simply "images" 62), which also reside at the remote computer 58. The document 60 and images 62 preferably are stored as files in a file system of the remote computer 58. The document 60 incorporates the images 62 using HTML tags that specify the location of files or other Internet resource containing the images on the Internet 52.

When used for browsing documents, the illustrated browser displays the document in a window 68 or rectangular area of the computer's display 30 allocated to the browser by the operating system. The illustrated window 68 comprises a frame 70, a document display area 72, and user interface controls 74. The browser provides the document display area 72 for displaying the document.

The browser and other client applications within the computer 20 preferably work with documents (which have data formats other than those native to the browser or client application) by encapsulating the document's data into an associated object, and integrating with the object using pre-defined interfaces as described more fully below. These document objects include the code to work with the document's data, including code to display the document data in the document display area 72. The browser thus operates as a host or container of document objects, by providing a window and frame which includes a document display area in which a hosted document object can display its document. Working with documents encapsulated as document objects allows full use of all the features described below.

Alternatively, the browser or other client application can work with a document by launching an application program associated with the document, and causing the associated application program to load the document and perform a specified operation on the document. In the Microsoft Windows® operating system, this is done by looking up the application program associated with the document's file name extension in the system registry, (e.g., ".doc" for Microsoft® Word documents, ".vsd" for Shapeware's VISIO drawings, etc.) and a text string command for directing the program to perform a desired operation. The application program associated with a document also may be identified in the Microsoft Windows® operating system by matching a bit pattern at specific offset into the file as also specified in the system registry. The browser or other client application patches the document's file name into the text string command, and invokes the operating system's shell execute service to execute the command. Shell execute is a well known Windows® operating system service which issues a text string as a command to the operating system's command interpreter (i.e., the "command.com" program in the Windows® operating system). The text string generally is in the form of an MS-DOS command, which specifies a path and file name of the associated application program's executable file, a flag for specifying the desired operation, and the document's path and file name. The command interpreter responds by parsing the text string, loading the application program specified in the text string, and passing the flag and the document's path and file name as command line arguments into the application program. The application program then "opens" (i.e., loads) the document and performs the operation specified by the flag.

2. Object Overview

Referring to FIG. 2, the illustrated embodiment of the invention utilizes objects which conform to the component object model (COM) of Microsoft Corporation's OLE. For a detailed discussion of OLE see *Inside OLE, Second Edition* by Kraig Brockschmidt, Microsoft Press, Redmond, Wash. 1995. A brief overview of objects in OLE and associated terminology is provided below before discussing the details of the illustrated embodiment.

An object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class (which for purposes of OLE are the interfaces of the base class).

OLE's COM specification defines binary standards for objects and their interfaces which facilitate the integration of software components. According to the COM specification, a typical object 80 is represented in the computer system 20 (FIG. 1) by an instance data structure 82, a virtual function table 84, and member functions 86–88. The instance data structure 82 contains a pointer 90 to the virtual function table 84 and data 92 (also referred to as data members, or properties of the object). A pointer is a data value that holds the address of an item in memory. The virtual function table 84 contains entries 96–98 for the member functions 86–88. Each of the entries 96–98 contains a reference to the code 86–88 that implements the corresponding member function.

The pointer 90, the virtual function table 84, and the member functions 86–88 implement an interface of the object 80. Client programs interact with the object 80 by obtaining a pointer (referred to as an interface pointer) to the pointer 90 of the virtual function table 84. OLE includes a type definition of an interface pointer which allows client programs to call member functions on the interface by name through the interface pointer and provides type checking on the function's arguments, as expressed in the following code (in the C++ programming language):

pinterface->MemberFunction( . . . )

Figure 3:
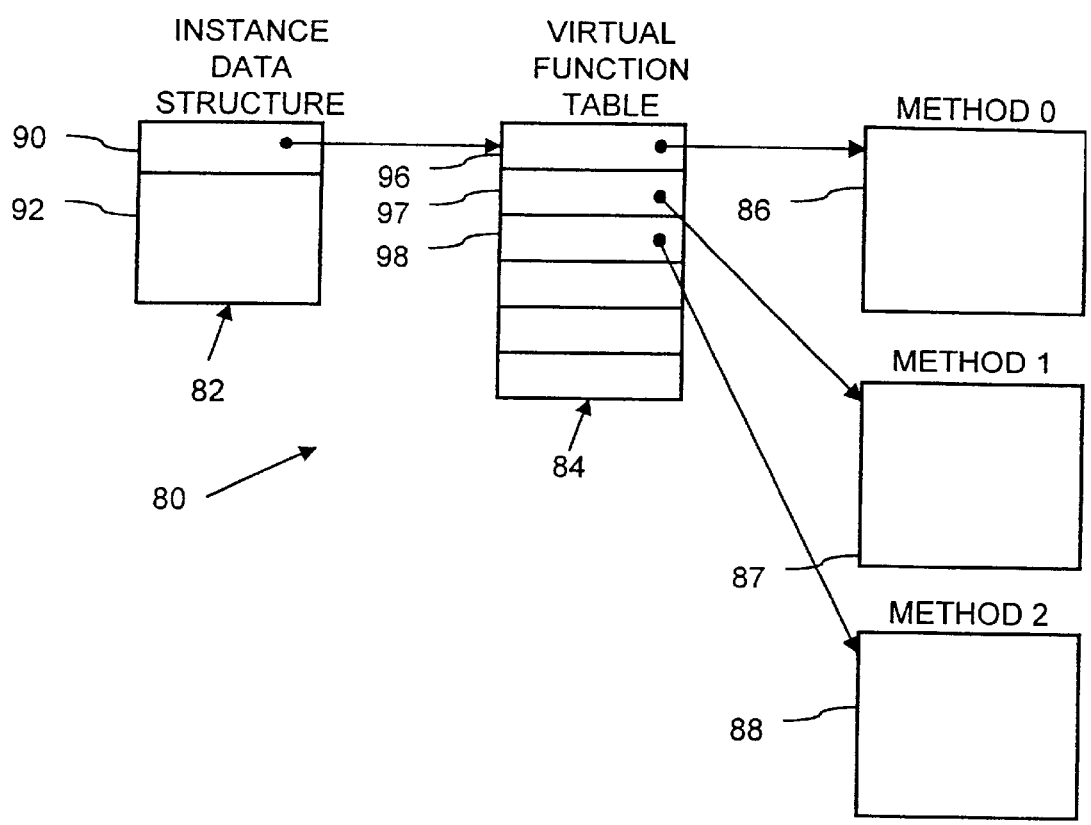
FIG. 3 is a block diagram of typical data structures for an object in the computer system of FIG. 1.

By convention, the interfaces of an object are illustrated graphically as a plug-in jack as shown for the document object in FIG. 3. Also, Interfaces conventionally are given names beginning with a capital "I." Objects can include multiple interfaces which are implemented with one or more virtual function tables. The member function of an interface is denoted as "IInterfaceName::FunctionName."

The object 80 conforming to the COM specification exhibits data encapsulation by exposing its interfaces (semantic groupings of its member functions) to client programs. The client programs interact with the object 80 by calling the member functions 86–88 on a particular interface of the object, but do not directly manipulate the object's data. The object 80 also exhibits polymorphism and inheritance in that the object 80 can provide interfaces in common with a base class and other similar objects, so that client programs can interact with each of the objects in the same manner by calling member functions of the interface that the objects have in common.

3. OLE Server and Document Object Overview

Figure 5:
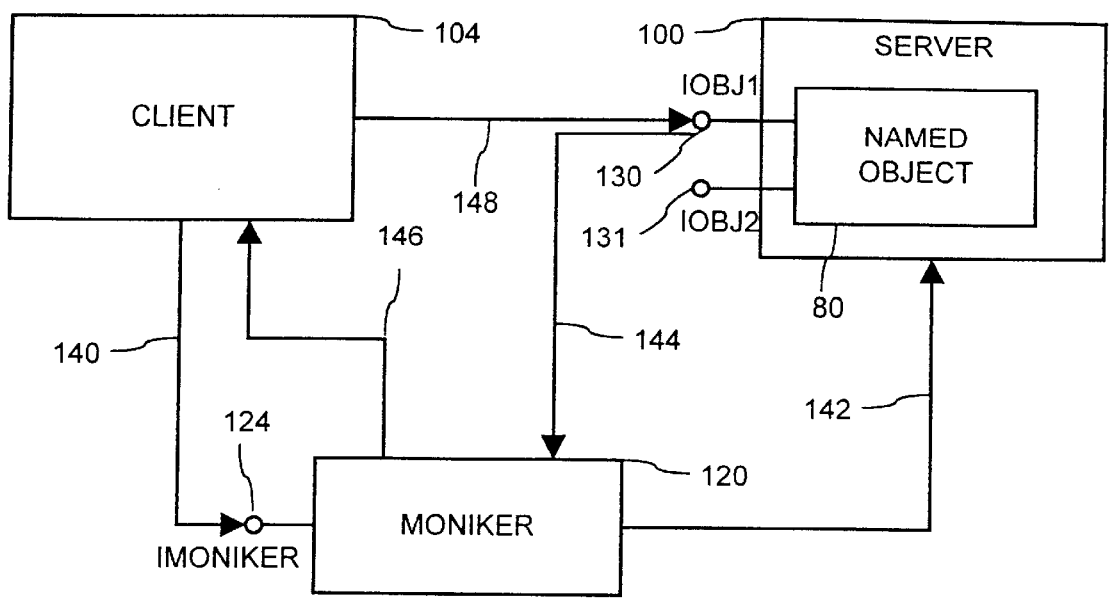
FIG. 5 is a process flow diagram of a binding process performed by the moniker of FIG. 4.

Referring now to FIG. 5, the virtual function table 84 and member functions 86–88 of the OLE object 80 are provided by a server application program 100 which is stored in the computer system 20 (FIG. 1) as an executable program file (with a ".exe" file name extension) or as a dynamic link library file (with a ".dll" file name extension). Dynamic link library files are loaded, dynamically linked, and executed by the Windows® operating system in a same process with a client application program. Executable program files are loaded by the operating system as a separately executing process. In accordance with OLE, the server application 100 includes code for the virtual function table 84 (FIG. 3) and member functions 86–88 (FIG. 3) of the classes that it supports, and also includes a class factory that generates the instance data structure 82 (FIG. 3) for an object of the class.

A server application can be written by a programmer to support a particular class of object that contains any desired data. For example, a programmer can write server applications which provide objects that contain the data of a particular variety of computer document (e.g., document 60 of FIG. 2), such as a text document, spreadsheet, drawing, etc., or that contain data for part of a computer document, such as a range of spreadsheet cells, a paragraph of a text document, etc. These objects which contain document data are referred to herein as document objects. For example, software application programs such as Microsoft® Word can be written as a server application in which the application program's documents are represented as OLE objects. A server application also can be written for representing the HTML document 60 and images 62 (FIG. 2) as OLE objects. This allows other client programs 104 (such as the unified browsing software program illustrated in FIG. 2) and objects to interact with the document through interfaces of the document object.

For the client program 104 to interact with the document object 80 provided by the server application 100, the server application must first create the object (i.e., instantiate an object of a class supported by the server application) and the client 104 must gain an interface pointer to the object 80. In OLE, the client program 104 realizes these events using services provided by OLE and a set of standard object interfaces defined by COM based on class and interface identifiers assigned to the object's class and interfaces. More specifically, the services are available to client programs as application programming interface (API) functions provided in the COM library, which is part of a component of the Windows® operating system in a file named "OLE32.DLL." In OLE, classes of objects are uniquely associated with class identifiers ("CLSIDs"). Class identifiers are 128-bit globally unique identifiers ("GUID") that the programmer creates with an OLE service named "CoCreateGUID" and assigns to the respective classes. The interfaces of an object are associated with interface identifiers ("IIDs").

In particular, the COM library provides an API function, "CoCreateInstance," that the client program 104 can call to request creation of an object to encapsulate a particular documents data using a CLSID associated with the data. The CoCreateInstance API function creates the object and returns a pointer of the requested interface to the client program.

Once the client program 104 has obtained a first interface pointer to the object 80, the client obtains pointers to other desired interfaces of the object using the interface identifier associated with the desired interface. COM defines several standard interfaces generally supported by OLE objects including the IUnknown interface. This interface includes a member function named "QueryInterface." The QueryInterface function can be called with an interface identifier as an argument, and returns a pointer to the interface associated with that interface identifier. By convention, the IUnknown interface's member functions are included as part of each interface on an object. Thus, any interface pointer that the client obtains to an interface of the object 80 can be used to call the QueryInterface function.

In a typical situation, however, the only information that the client program 104 has to reference a particular document is a textual name, such as a file name or an Internet URL. In the case of a file name, the COM library provides API functions (e.g., "GetClassFile," "ReadClassStg" and "ReadClassStm") for obtaining a CLSID associated with the file. These functions, however, are specific to document data that is stored as a file in a computer's local storage.

4. Moniker Overview

Figure 4:
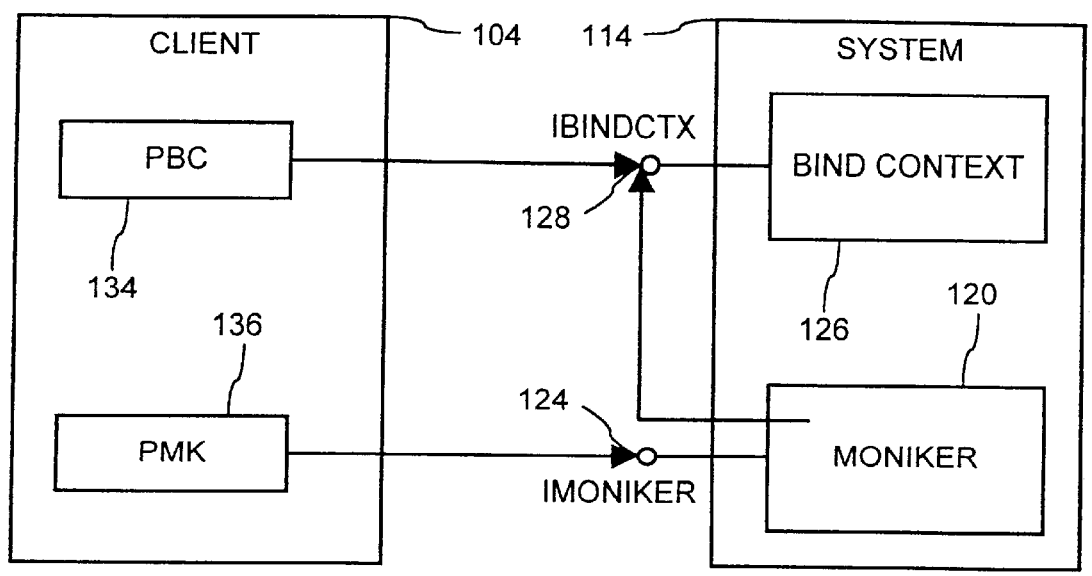
FIG. 4 is a block diagram of software components that support binding to a named object using a moniker.

With reference to FIGS. 4 and 5, the client program 104 also can gain access (i.e., a pointer to an interface) to the object 80 which encapsulates some desired data based on a name that references the object using a moniker 120. The moniker 120 generally is provided by the COM library of the operating system 114. Alternatively, the moniker may be provided by the server application associated with the object 80. The system 114 includes API functions which the client program 104 calls to have a moniker created for a given name. In OLE, there are four standard classes of monikers, i.e., file moniker, item moniker, pointer moniker, and anti-moniker, which are described more fully in the book, *Inside OLE, second edition,* supra. The API functions for creating a moniker of these standard moniker classes are summarized in the following table:

TABLE 1

| OLE Moniker APIs | |
|---|---|
| Function | Description |
| CreateFileMoniker(pszPath, ppmk) | Creates a file moniker, given any portion of a path name in pszFile. The portion can be as short as a drive letter or as long as a complete path. The file moniker converts pszPath to a standard UNC path. Anything the operating system understands as a path is suitable for a file moniker. |
| CreateItemMoniker(pszDelim, pszItem, ppmk) | Creates an item moniker for which pszItem identifies the item's name and pszDelim identifies a delimiter string (usually a single character such as !), which does not occur elsewhere in pszItem. This delimiter is used to prefix the item's display name, allowing it to be combined with other items in the same string and parsed out of that string again. |
| CreatePointerMoniker(pIUnknown, ppmk) | Creates a pointer moniker to encapsulate the pointer passed in pIUnknown. This makes any object look like a moniker. |
| CreateAntiMoniker(ppmk) | Creates an anti-moniker, which needs no extra information. |

For creating a moniker based on a user-provided name, the system 114 also provides an OLE API function called MkParseDisplayName, which has the following form:

```
HRESULT MkParseDisplayName(IBindCtx *pbc, LPCWSTR pszName,
    ULONG *pchEaten, IMoniker **ppmk)
```

The MkParseDisplayName API function parses a text string (the parameter "pszName") into a moniker. The text string can have one of two initial patterns: a uniform naming convention (UNC) path name (a conventional file system path name such as "c:\directory\file"), or the character "@" followed by a program identifier (ProgID) of a server application. In the case of a UNC path name, the API function creates a file moniker and calls the file moniker's "ParseDisplayName" function (described below) to parse the text string. In the case of a text string with the "@" character and ProgID, the API function creates an object based on a CLSID associated with the ProgID in the operating system's registry database and calls a "ParseDisplayName" member function on an "IParseDisplayName" interface of that object, which is defined as follows:

```
interface IParseDisplayName : IUnknown {
    HRESULT ParseDisplayName(IBindContext *pbc,
        LPOLESTR pszDisplayName, ULONG
        *pchEaten, IMoniker **ppmkOut);
};
```

By effectively plugging in a new name-to-moniker parser in this way, the MkParseDisplayName API can be extended to create new classes of monikers.

The moniker 120 exposes a set of member functions to the client 104 through an interface 124, designated IMoniker, which is defined as follows:

```
interface IMoniker : public IPersistStream {
public:
    HRESULT BindToObject(IBindCtx *pbc, IMoniker *pmkToLeft,
        REFIID riidResult, void *ppvResult);
    HRESULT BindToStorage(IBindCtx *pbc, IMoniker
        *pmkToLeft, REFIID riid, void **ppvObj);
    HRESULT Reduce(IBindCtx *pbc, DWORD
        dwReduceHowFar, IMoniker **ppmkToLeft, IMoniker
        **ppmkReduced);
    HRESULT ComposeWith(IMoniker *pmkRight, BOOL
        fOnlyIfNotGeneric, IMoniker **ppmkcomposite);
    HRESULT Enum(BOOL fForward, IEnumMoniker
        **ppenumMoniker);
    HRESULT IsEqual(IMoniker *pmkOtherMoniker);
    HRESULT Hash(DWORD *pdwHash);
    HRESULT IsRunning(IBindCtx *pbc, IMoniker *pmkToLeft,
        IMoniker *pmkNewlyRunning);
    HRESULT GetTimeOfLastChange(IBindCtx *pbc, IMoniker
        *pmkToLeft, FILETIME *pFileTime);
    HRESULT Inverse(IMoniker **pmk);
    HRESULT CommonPrefixWith(IMoniker *pmkOther, IMoniker
        **ppmkPrefix);
    HRESULT RelativePathTo(IMoniker *pmkOther, IMoniker
        **ppmkRelPath);
    HRESULT GetDisplayName(IBindCtx *pbc, IMoniker
        *pmkToLeft, LPOLESTR *ppszDisplayName);
    HRESULT ParseDisplayName(IBindCtx *pbc, IMoniker
        *pmkToLeft, LPOLESTR *pszDisplayName, ULONG
        *pchEaten, IMoniker **ppmkOut);
    HRESULT IsSystemMoniker(DWORD *pdwMksys);
};
```

As indicated in the above interface definition, the IMoniker interface is derived from the IPersistStream interface, which is a well known OLE interface for objects that can read and write their state persistently as a data stream or file in the computer's secondary storage 42 (FIG. 1). This means that the moniker 120 also includes member functions to support the IPersistStream interface, which allows the client to store and load the moniker 120 from the secondary storage.

The member functions which the moniker 120 exposes through the IMoniker interface 124 include two functions, BindToObject and BindToStorage (herein collectively referred to as BindToXxx), which the client 104 calls to bind to the named object 80. The BindToObject function performs binding by instantiating the named object 80 in the memory 40 (FIG. 1) of the computer, and returns an interface pointer of the named object 80 to the client 104. The BindToStorage function performs binding by instantiating the named object 80 onto an OLE storage stream which is stored in the computer's secondary storage 42 (e.g., on the hard drive), rather than into the main memory 40. In the browsing environment 50 illustrated in FIG. 2 for example, the BindToStorage function is used to download a file such as an image or video clip directly onto hard disk storage, whereas the BindToObject function is used to create an instance of an object for an HTML document with code for viewing the document.

The IMoniker interface 124 also exposes the functions, GetDisplayName and ParseDisplayName, of the moniker 120 to the client 104. The GetDisplayName function returns a human-readable display name of the object 80 which the client can display to the user, such as in a list box control or other user interface element. The display name is a text string that names the object 80, such as a path and file name or an Internet URL. The ParseDisplayName function operates in reverse, creating a moniker based on a text string provided by the client.

Further details of the moniker's member functions are described in *Inside OLE, second edition*, supra.

When calling most of the moniker's member functions, the client program 104 passes a pointer to a bind context 126 as a parameter of the call. The bind context 126 is an object which operates as a central repository of information used globally in the binding process, such as a table of running objects. The bind context 126 has an interface 128, designated IBindCtx, which is defined as follows:

```
interface IBindCtx: IUnknown
    {
    HRESULT RegisterObjectBound(IUnknown *pUnk);
    HRESULT RevokeObjectBound(IUnknown *pUnk);
    HRESULT ReleaseBoundObjects(void);
    HRESULT SetBindOptions(BIND_OPTS *pbindopts);
    HRESULT GetBindOptions(BIND_OPTS *pbindopts);
    HRESULT GetRunningObjectTable(IRunningObjectTable
        **ppROT);
    HRESULT RegisterObjectParam(LPOLESTR pszKey,
        IUnknown *pUnk);
    HRESULT GetObjectParam(LPOLESTR pszKey, IUnknown
        **ppUnk);
    HRESULT EnumOjbectParam(IEnumString **ppEnum);
    HRESULT RevokeObjectParam(LPOLESTR pszKey);
    };
```

The bind context 126 is provided by the system 114. The client program 104 creates the bind context 126 by calling a system API function, CreateBindCtx. The client program 104 creates the bind context once, then passes a pointer to the bind context's IBindCtx interface in calls to the moniker 120. This allows the moniker 120 to retrieve global information stored in the bind context 126 by calling functions on the IBindCtx interface. When called by the client to bind to the named object 80 for example, the moniker 120 can look in the running objects table of the bind context 126 to determine whether the object already exists. If the object exists, the moniker 120 can simply return an interface pointer of the existing object to the client 104, and thus avoid creating the object again. Other uses of the bind context are described in *Inside OLE, second edition,* supra.

FIG. 5 illustrates the operation of the moniker 120 performing the binding process for the client program 104 to an interface of the named object 80. In the illustrated example, the client program 104 uses the moniker 120 to bind to the object referenced by a name with code such as the following:

```
HRESULT hr;
IBindCtx* pbc;
hr=CreatBindCtx(0, &pbc);
...
IMoniker *pmk;
IObj1 *pObj;
GetMonikerSomehow(&pmk);
hr = pmk->BindToObject(pbc,0,IID_IObj1, &pObj);
if (hr==S_OK){
        pObj->SomeFunction( . . . );
        }
```

In this example, the named object 80 exposes a member function, SomeFunction, through an IObj1 interface 130, and includes a second interface 131, IObj2. With the above code, the client first creates the bind context 126 which will be used later by the moniker 120 when binding to the named object 80. The client creates the bind context by calling the CreateBindCtx API function of the system 114 as described above. The CreateBindCtx API function returns an interface pointer of the IBindCtx interface 128 to the client 104, which the client stores as the pointer variable 134, pbc.

The client next creates the moniker 120 which names the object 80 using a moniker creation API function of the system 114 as described above (e.g., MKParseDisplayName). The client is returned an interface pointer of the IMoniker interface 124. In this example code, the client stores this pointer to the IMoniker interface 124 of the moniker 120 as a pointer variable 136, pmk. The client 104 then performs a call 140 to the BindToObject function on the IMoniker interface 124 of the moniker 120 to bind to the named object 80. In the call 140, the client passes an interface identifier (IID_IObj1) to request binding to a particular interface (the IObj1 interface 130) of the named object 80.

In the moniker's BindToObject function, the moniker 120 includes code which launches the object's server application program 100, requests creation of the named object, and queries for a pointer to the interface requested by the client. The moniker 120 typically performs these steps with calls 142 to the GetClassFile and CoCreateInstance API functions described above, and to the QueryInterface member function of the object 80 to query for the requested interface of the object as also described above. As a result, the object 80 is instantiated by its class factory in the server application 100, and returns (144) a pointer of the requested interface (the IObj1 interface 130 in this example) of the named object 80 to the moniker 120. The moniker 120, in turn, returns (146) the object's interface pointer to the client program 104. Whereupon, the client program can directly call (148) member functions on the interface of the named object 80. At this point, the binding process is complete and the moniker 120 is no longer needed by the client program 104 to access the named object 80.

5. Asynchronous Monikers

Figure 6:
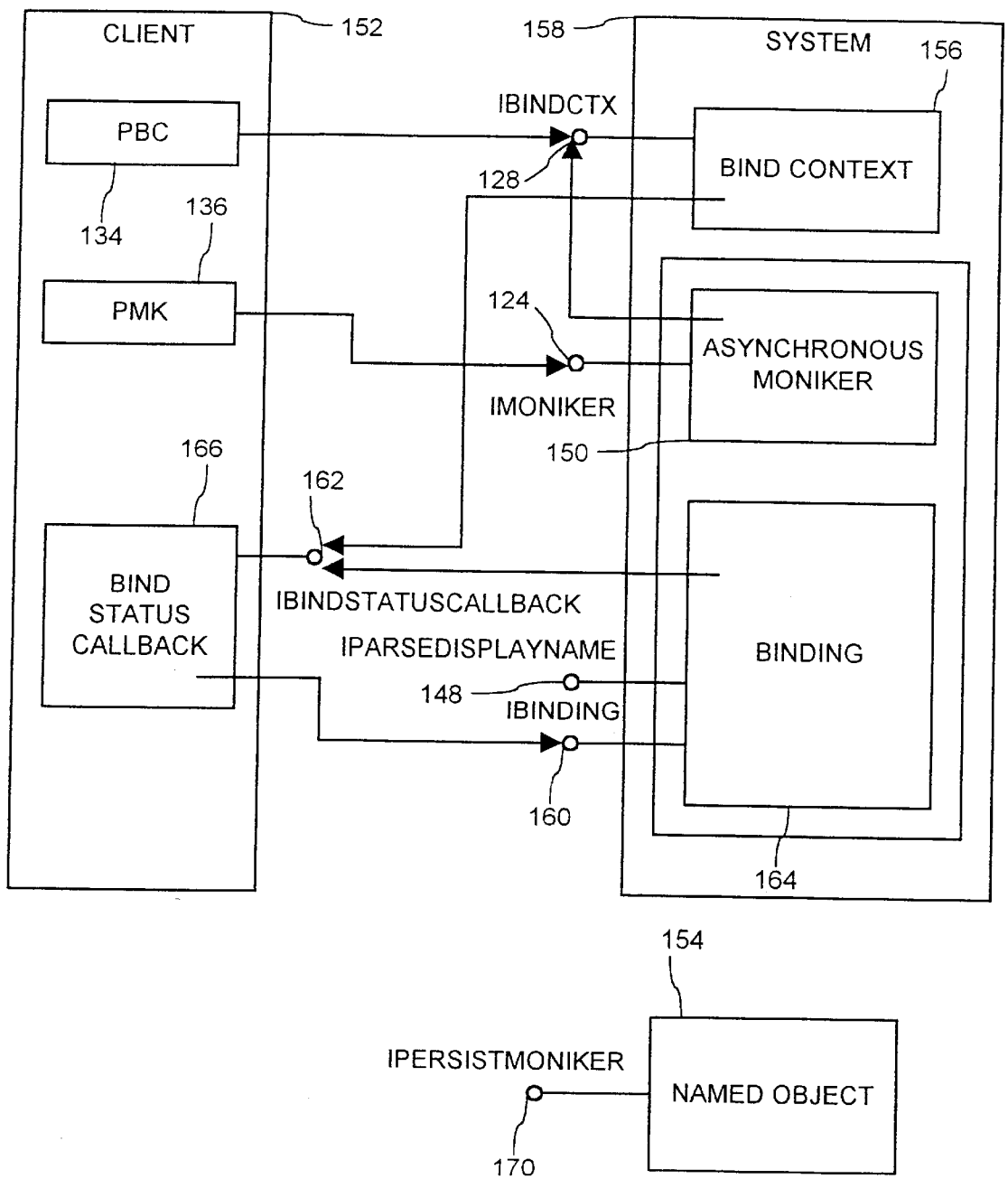
FIG. 6 is a block diagram of software components including an asynchronous moniker for unified browsing to data in the computer of FIG. 1 according to one illustrated embodiment of the invention.

In an illustrated embodiment of the invention shown in FIG. 6, a client program (hereafter "client") 152 uses an asynchronous moniker 150 to asynchronously bind to a named object 154. The asynchronous moniker 150 is an instance of an asynchronous moniker class which is derived from the moniker class and supports the IMoniker interface 124. Asynchronous binding effectively retrieves data from its source as a background process which allows the client 152 to continue execution. Since the client 152 is not blocked, the client's user interface remains responsive during the binding process. This is particularly useful for loading objects having data from slow sources, such as the Internet and other remote networks with high latency and slow data transfer connections. The client 152 thus is able to more uniformly browse data from fast and slow sources while maintaining the user perception of equivalent responsiveness and quality of service.

Similar to the use of standard OLE monikers described above, the client 152 creates an asynchronous bind context 156, and the asynchronous moniker 150 by calling API functions (specifically, the CreateAsyncBindCtx API function and the MkParseDisplayNameEx API functions both described below) provided by an operating system component 158 (specifically a component such as the COM library 114 of FIG. 4, which additionally implements the asynchronous moniker API functions described below). The asynchronous bind context supports IBindCtx interface 128 of the bind context 126 (FIG. 4). The client 152 then calls the BindToObject or BindToStorage function on the IMoniker interface 124 of the asynchronous moniker 150 to initiate the asynchronous binding process.

The asynchronous binding process involves additional communication or "handshaking" between the client 152 and asynchronous moniker 150 not performed in the synchronous binding process by standard OLE monikers (e.g., the moniker 120). In the asynchronous binding process, the asynchronous moniker 150 returns control immediately to the client 152 from the client's call (e.g., call 140 of FIG. 5) to one of the asynchronous moniker's binding functions (e.g., BindToObject and BindToStorage). After the call returns, instantiation of the named object 154 and loading of the object's data proceeds. Meanwhile, the client and asynchronous binding process continue communicating so that the client remains informed of the progress of loading the data and can interrupt or terminate loading of the data.

This handshaking between the client 152 and the asynchronous binding process is effected using two additional interfaces, an IBinding interface 160 and an IBindStatusCallback interface 162. In the illustrated embodiment of the invention, the IBinding interface 160 is an interface of a binding object 164 which is provided by the asynchronous moniker 150. The client 152 implements a bind-status-callback object 166 which supports the IBindStatusCallback interface 162.

Prior to initiating the asynchronous binding process with a call to the IMoniker interface 124 of the asynchronous moniker 150, the client 152 registers its bind-status-callback object 166 with the asynchronous bind context via the RegisterBindStatusCallback API function described more fully below. When the client thereafter calls the IMoniker::BindToObject or IMoniker::BindToStorage function as shown in FIG. 5 and described above, the client 152 passes an interface pointer of the bind context's IBindCtx interface 128 to the asynchronous moniker 150. In the IMoniker::BindToxxx function, the asynchronous moniker 150 looks up the client's bind-status-callback object 164, creates the binding object 164, and hooks together the binding object 164 and the client's bind-status-callback object 166 by passing an interface pointer of the IBinding interface 160 to the bind-status-callback object 166 (with a call to the bind-status-callback object's IBindStatusCallback::OnStartBinding function described more fully below). The asynchronous moniker 150 then returns control to the client 152 from the IMoniker::BindToxxx function, and allows the binding object 164 to proceed with the binding process with the binding object 164 and bind-status-callback object 166 communicating directly.

5.1 Asynchronous and Synchronous Binding Selection

In the illustrated embodiment, the client 152 can determine whether any particular moniker supports asynchronous binding (i.e., is an asynchronous moniker) by calling an IsAsyncMoniker API function (described below). The client 152 can further control whether the asynchronous moniker 150 performs binding asynchronously or synchronously by setting a BINDF_ASYNCHRONOUS flag when the asynchronous moniker 150 calls an IBindStatusCallback::GetBindInfo function (described below) of the client's bind-status-callback object 166 at the beginning of the bind operation.

When the client 152 specifies asynchronous binding, the asynchronous moniker 150 does not return an object or storage pointer from the client's call to the IMoniker::BindToObject or IMoniker::BindToStorage function. Instead, the asynchronous moniker 150 returns the value, MS_S_ASYNCHRONOUS, and a NULL pointer. The client 152 then waits to receive the requested object or storage from the asynchronous moniker in a call to the client's IBindStatusCallback::OnObjectAvailable or IBindStatusCallback::OnDataAvailable function (described below).

On the other hand, if the client does not set the BINDF_ASYNCHRONOUS flag, the asynchronous moniker synchronously binds the object or storage, and returns the object or storage from the client's call to the asynchronous moniker's IMoniker::BindToObject or IMoniker::BindToStorage function.

5.2 Asynchronous and Synchronous Storage

In a call to the IBindStatusCallback::OnDataAvailable function (described below) during asynchronous binding to storage, the asynchronous moniker 150 also may return an asynchronous storage object. This asynchronous storage object supports the IStream or IStorage interface (well known OLE interfaces), and its implementation of the functions in that interface allows access to some of the data being bound while the binding is still in progress. The client 152 can choose between two modes for the asynchronous storage object: blocking and non-blocking. If data is not yet available in the blocking mode (the default), the client's call to the asynchronous storage object blocks until the data arrives. In the non-blocking mode, the asynchronous storage object returns an error value, E_PENDING, to the client's call when data is not yet available. In response, the client waits for further notifications to its IBindStatusCallback::OnDataAvailable function before retrying the operation. The client 152 can choose between a synchronous (blocking) and asynchronous (non-blocking) storage by choosing whether or not to set the BINDF_ASYNCSTORAGE flag in the pgrfBINDF value which the client returns from the IBindStatusCallback::GetBindInfo function (described below) to the asynchronous moniker 150.

5.3 Data-pull and Data-push Models

The client 152 can choose between a data-pull and data-push model for driving the asynchronous binding in the asynchronous moniker's IMoniker::BindToStorage function, and receiving asynchronous notifications. In the data-pull model, the client 152 drives the bind operation. The asynchronous moniker 150 only provides data to the client 152 when the client reads the data. Specifically, this means that beyond the asynchronous moniker's first call to the IBindStatusCallback::OnDataAvailable function (described below), the asynchronous moniker 150 will not provide any data to the client unless the client has consumed all of the data that is already available. Because the asynchronous moniker 150 only downloads data as it is requested, the client nevertheless should read the data in a timely manner. In the case of downloading data from Internet for example, the bind operation may fail if the client 152 waits too long before requesting more data.

On the other hand, in a data-push model, the asynchronous moniker 150 will drive the bind operation and continuously notifies the client whenever new data is available (i.e., by calling the client's IBindStatusCallback::OnDataAvailable function). In such cases, the client 152 may choose whether or not to read the data at any point during the bind operation, but the asynchronous moniker continues to drive the bind operation until completion.

5.4 The IBinding Interface

The IBinding interface 160 is implemented by the asynchronous moniker 150 on the binding object 164, which is a separate object that the asynchronous moniker 150 creates on a per-bind operation basis. The IBinding interface 160 exposes member functions of the binding object 164 which allow control of the bind operation performed by the binding object. The asynchronous moniker 164 provides the client 152 with access to the IBinding interface 160 by passing a pointer of the IBinding interface to the client's bind-status-callback object 166 via a call to the IBindStatusCallback::OnStartBinding function described below.

The IBinding interface 160 is defined as follows:

```
//+------------------------------------------------------------------------
//
// Copyright (C) Microsoft Corporation, 1995–1996.
//
// Contents: IBinding interface definition
//
//-------------------------------------------------------------------------
cpp_quote("#ifndef _LPBINDING_DEFINED")
cpp_quote("#define _LPBINDING_DEFINED")
[
    object,
    uuid(79eac9c0-baf9-11ce-8c82-00aa004ba90b),
    pointer_default(unique)
]
interface IBinding: IUnknown
{
    typedef [unique] IBinding *LPBINDING;
    HRESULT Abort( );
    HRESULT Suspend( );
    HRESULT Resume( );
    HRESULT SetPriority(
        [in] LONG nPriority);
    HRESULT GetPriority(
        [out] LONG * pnPriority);
    [local] HRESULT GetBindResult(
        [out]     CLSID *pclsidProtocol,
        [out]     DWORD *pdwResult,
        [out]     LPOLESTR *pszResult,
        [in, out] DWORD *pdwReserved);
    [call_as(GetBindResult)]
    HRESULT RemoteGetBindResult(
        [out] CLSID *pclsidProtocol,
        [out] DWORD *pdwResult,
        [out] LPOLESTR *pszResult,
```

-continued

```
        [in] DWORD dwReserved);
}
cpp_quote("#endif")
```

5.4.1 The IBinding:Abort Function

The IBinding::Abort member function permanently aborts the bind operation. After aborting the bind operation, the client may still receive some notifications about the binding.

An aborted bind operation will result in a call to the IBindStatusCallback::OnStopBinding function (described below) with a corresponding error code. Alternatively, the aborted bind operation results in a failure of the client's call to the IMoniker::BindToObject/BindToStorage function in the situation where that call has not previously returned. At this point the bind operation is officially complete and the client must release any pointers obtained during the binding.

The return values of the illustrated IBinding::Abort function are shown in the following table:

TABLE 2

Return Values of the IBinding::Abort Function

| Argument | Type | Description |
| --- | --- | --- |
| Returns | S_OK | Success |
|  | S_FALSE | The bind operation was already aborted. |
|  | E_FAIL | The bind operation could not be aborted. |

5.4.2 The IBinding::Suspend Function

The IBinding::Suspend function suspends the bind operation. The bind operation will be suspended until resumed by a later call to the IBinding::Resume function or canceled by a call to the IBinding::Abort function. After calling IBinding::Suspend the client may still receive some notifications about the bind operation.

The return values of the illustrated IBinding::Suspend Function are shown in the following table:

TABLE 3

IBinding::Suspend Function Return Values

| Argument | Type | Description |
| --- | --- | --- |
| Returns | S_OK | Success |
|  | S_FALSE | The bind operation was already suspended. |
|  | E_FAIL | The bind operation could not be suspended. |

5.4.3 The IBinding::Resume Function

The IBinding::Resume function resumes a suspended bind operation. The bind operation must have been previously suspended by a call to the IBinding::Suspend function. The return values of the illustrated IBinding::Suspend function are shown in the following table:

TABLE 4

Return Values of the IBinding::Resume Function

| Argument | Type | Description |
| --- | --- | --- |
| Returns | S_OK | Success |
|  | S_FALSE | The bind operation was not previously suspended. |
|  | E_FAIL | The suspended bind operation could not be resumed. |

5.4.4 The IBinding::SetPriority Function

The IBinding::SetPriority function establishes the priority for the bind operation according to an input parameter, nPriority. The priority values are taken from the Microsoft Corporation's Win32 thread priority APIs (SetThreadPriority and GetThreadPriority). The final priority is determined from values gathered from all clients of the bind operation. The parameter and return values of the illustrated IBinding::SetPriority function are shown in the following table.

TABLE 5

IBinding::SetPriority Function Parameters and Return Values

| Argument | Type | Description |
| --- | --- | --- |
| nPriority | LONG | A value indicating the priority to establish for this binding relative to other bindings and the system. |
| Returns | S_OK | Success. |
|  | E_FAIL | The priority could not be changed. |

5.4.5 The IBinding::GetPriority Function

The IBinding::GetPriority function retrieves the current priority of the bind operation. The priority values are taken from the Win32 thread priority APIs (SetThreadPriority and GetThreadPriority). The parameters and return values of the illustrated function are shown in the following table.

TABLE 5

IBinding::GetPriority Function Parameters and Return Values

| Argument | Type | Description |
| --- | --- | --- |
| pnPriority | LONG* | Location to return a value indicating the priority established for this binding relative to other bindings and the system. May not be NULL. |
| Returns | S_OK | Success. |
|  | E_INVALIDARG | The pnPriority argument is invalid. |

5.5 The IBindStatusCallback Interface

The IBindStatusCallback interface 162 exposes member functions of the bind-status-callback object 166 provided by the client 152. These members functions are called by the asynchronous moniker 150 and binding object 164 to provide notifications to the client 152 relating to the bind operation, e.g., the bind operation's status and progress updates. The asynchronous moniker 150 calls the notification member functions of the IBindStatusCallback in the IMoniker::BindToObject and BindToStorage functions, and the binding object 164 will continue to call the notification member functions in an asynchronous bind operation after the asynchronous moniker returns from the BindToObject or BindToStorage function.

The asynchronous moniker 150 also calls two member functions, the GetBindInfo and GetPriority functions (described below), to receive additional information for the bind operation from the client 152. In its BindToObject or BindToStorage function, the asynchronous moniker calls the IBindStatusCallback::GetBindInfo function (described below) to check at least the BINDF_ASYNCHRONOUS flag which indicates whether to perform the bind operation asynchronously. The asynchronous moniker 150 also may call the IBindStatusCallback::GetPriority to set the priority of the bind operation. Further, the asynchronous moniker 150 may call the IBindStatusCallback::QueryInterface function to request an interface pointer of a further interface of the client through which the asynchronous moniker can obtain further information or access additional or extended services.

In the illustrated embodiment, the client 152 provides the bind-status-callback object 166 in association with a specific bind operation. The caller of the member functions exposed through the IBindStatusCallback interface thus need not pass information identifying the specific bind operation.

The client 152 registers the IBindStatusCallback interface of its bind-status-callback object 166 into the asynchronous bind context by calling the RegisterBindStatusCallback API function described below. The asynchronous bind context registers only a single IBindStatusCallback interface at a time (i.e., that of the last client to call the RegisterBindStatusCallback API function). However, the RegisterBindStatusCallback API function returns an interface pointer of the previously registered IBindStatusCallback interface to allow chaining of IBindStatusCallback interface notifications between multiple clients. So that notifications can be chained to multiple clients through the registered client, the client with the registered IBindStatusCallback interface will receive all IBindStatusCallback notifications from the asynchronous bind context. The asynchronous moniker 150 retrieves the interface pointer of the IBindStatusCallback interface which is registered for a particular bind operation from the asynchronous bind context in its IMoniker::BindToObject or BindToStorage member functions.

If the asynchronous moniker 150 invokes other monikers as part of the bind operation, the asynchronous moniker may register its own IBindStatusCallback interface (not shown) in the asynchronous bind context to receive notification from the other moniker. The notifications through the IBindStatusCallback interfaces of more than one moniker involved in a bind operation can thus be chained to provide consolidated progress notifications.

The definition of the IBindStatusCallback interface 162 and related data structures is as follows:

```
//+-----------------------------------------------------------
//
// Copyright (C) Microsoft Corporation, 1995–1996.
//
// Contents: IBindStatusCallback interface definition
//
//------------------------------------------------------------
cpp_quote("#ifndef _LPBINDSTATUSCALLBACK_DEFINED")
cpp_quote("#define _LPBINDSTATUSCALLBACK_DEFINED")
[
    object,
    uuid(79eac9c1-baf9-11ce-8c82-00aa004ba90b),
    pointer_default(unique)
]
```

-continued

```
interface IBindStatusCallback: IUnknown
{
    typedef [unique] IBindStatusCallback
        *LPBINDSTATUSCALLBACK;
    typedef enum
    {
        BINDVERB_GET      = 0x00000000,  // default action
        BINDVERB_POST     = 0x00000001,  // post verb
        BINDVERB_PUT      = 0x00000002,  // put verb
        BINDVERB_CUSTOM   = 0x00000003,  // custom verb
    }BINDVERB;
    typedef enum
    {
        BINDINFOF_URLENCODESTGMEDDATA = 0x00000001,
            // url encode the stgmed data
        BINDINFOF_URLENCODEDEXTRAINFO = 0x00000002,
            // url encode the extra info
    }BINDINFOF;
    // flags that describe the type of transaction that caller wants
    typedef enum
    {
        BINDF_ASYNCHRONOUS            = 0x00000001,
        BINDF_ASYNCSTORAGE            = 0x00000002,
        BINDF_NOPROGRESSIVERENDERING  = 0x00000004,
        BINDF_OFFLINEOPERATION        = 0x00000008,
        BINDF_GETNEWESTVERSION        = 0x00000010,
        BINDF_NOWRITECACHE            = 0x00000020,
        BINDF_PULLDATA                = 0x00000080,
        BINDF_IGNORESECURITYPROBLEM   = 0x00000100,
        BINDF_RESYNCHRONIZE           = 0x00000200,
        BINDF_HYPERLINK               = 0x00000400,
        BINDF_COMPLETEDOWNLOAD        = 0x01000000,
        BINDF_INLINESGETNEWESTVERSION = 0x10000000,
        BINDF_INLINESRESYNCHRONIZE    = 0x20000000,
        BINDF_CONTAINER_NOWRITECACHE  = 0x40000000
    }BINDF;
    typedef struct_tagBINDINFO
    {
        ULONG     cbSize;
        LPWSTR    szExtraInfo;     // e.g. string added to the URL
            string [range byte]
        STGMEDIUM stgmedData;      // e.g. put or post data
        DWORD     grfBindInfoF;    // e.g. how meddata should be
            treaded
        DWORD     dwBindVerb;      // e.g. put, post, . . .
        LPWSTR    szCustomVerb;    // e.g. custom verb
        DWORD     cbstgmedData;    // size of data in stgmedData
    }BINDINFO;
    typedef struct_tagRemBINDINFO
    {
        ULONG     cbSize;
        LPWSTR    szExtraInfo;     // e.g. string added to the URL
            string [range byte]
        DWORD     grfBindInfoF;    // e.g. how meddata should be
            treaded
        DWORD     dwBindVerb;      // e.g. put, post, . . .
        LPWSTR    szCustomVerb;    // e.g. custom verb
        DWORD     cbstgmedData;    // size of data in stgmedData
    }RemBINDINFO;
    typedef struct tagRemFORMATETC {
        DWORD cfFormat;
        DWORD ptd;
        DWORD dwAspect;
        LONG  lindex;
        DWORD tymed;
    }RemFORMATETC, *LPREMFORMATETC;
    // Data notification flags
    typedef enum
    {
        BSCF_FIRSTDATANOTIFICATION        = 0x00000001,
        BSCF_INTERMEDIATEDATANOTIFICATION
            = 0x00000002,
        BSCF_LASTDATANOTIFICATION         = 0x00000004
    }BSCF;
    typedef enum tagBINDSTATUS
    {
        BINDSTATUS_FINDINGRESOURCE    = 1
        ,BINDSTATUS_CONNECTING
        ,BINDSTATUS_REDIRECTING
```

-continued

```
        ,BINDSTATUS_BEGINDOWNLOADDATA
        ,BINDSTATUS_DOWNLOADINGDATA
        ,BINDSTATUS_ENDDOWNLOADDATA
        ,BINDSTATUS_BEGINDOWNLOADCOMPONENTS
        ,BINDSTATUS_INSTALLINGCOMPONENTS
        ,BINDSTATUS_ENDDOWNLOADCOMPONENTS
        ,BINDSTATUS_USINGCACHEDCOPY
        ,BINDSTATUS_SENDINGREQUEST
        ,BINDSTATUS_CLASSIDAVAILABLE
        ,BINDSTATUS_MIMETYPEAVAILABLE
        ,BINDSTATUS_CACHEFILENAMEAVAILABLE
        ,BINDSTATUS_BEGINSYNCOPERATION
        ,BINDSTATUS_ENDSYNCOPERATION
    }BINDSTATUS;
        HRESULT OnStartBinding(
            [in] DWORD dwReserved,
            [in] IBinding * pib);
        HRESULT GetPriority(
            [out] LONG * pnPriority);
        HRESULT OnLowResource(
            [in] DWORD reserved);
        HRESULT OnProgress(
            [in] ULONG ulProgress,
            [in] ULONG ulProgressMax,
            [in] ULONG ulStatusCode,
            [in] LPCWSTR szStatusText);
        HRESULT OnStopBinding(
            [in] HRESULT hresult,
            [in, unique] LPCWSTR szError);
        [local]
        HRESULT GetBindInfo(
            [out] DWORD *grfBINDF,
            [in, out, unique] BINDINFO * pbindinfo);
        [call_as(GetBindInfo)]
        HRESULT RemoteGetBindInfo(
            [out] DWORD *grfBINDF,
            [in, out, unique] RemBINDINFO * pbindinfo,
            [in, out, unique] RemSTGMEDIUM* pstgmed);
        [local]
        HRESULT OnDataAvailable(
            [in] DWORD grfBSCF,
            [in] DWORD dwSize,
            [in] FORMATETC* pformatetc,
            [in] STGMEDIUM* pstgmed);
        [call_as(OnDataAvailable)]
        HRESULT RemoteOnDataAvailable(
            [in] DWORD grfBSCF,
            [in] DWORD dwSize,
            [in] RemFORMATETC *pformatetc,
            [in] RemSTGMEDIUM* pstgmed);
        HRESULT OnObjectAvailable(
            [in] REFIID riid,
            [in, iid_is(riid)] IUnknown* punk);
}
cpp_quote("#endif")
```

5.5.1 The BINDVERB Enumeration

The BINDVERB enumeration defines values that are passed to the client 152 with the IBindStatusCallback::GetBindInfo function to distinguish different types of bind operations. The illustrated BINDVERB enumeration values are shown in the following table:

TABLE 6

| BINDVERB Enumeration Values | |
|---|---|
| Value | Description |
| BINDVERB_GET | Perform a "get" operation (the default). The stgmedData member of the BINDINFO should be set to TYMED_NULL. |
| BINDVERB_POST | Perform a "post" operation. The data to post should be specified in the stgmedData member of the BINDINFO. |
| BINDVERB_PUT | Perform a "put" operation. The data to put should be specified in the stgmedData member of the BINDINFO. |
| BINDVERB_CUSTOM | Perform a custom operation (protocol specific, see szCustomVerb member of BINDINFO). The data to use should be specified in the stgmedData member of the BINDINFO. |

5.5.2 The BINDINFOF Enumeration

The BINDINFOF enumeration defines values that are passed to the client 152 within the IBindStatusCallback::GetBindInfo function to specify additional flags for controlling the bind operation. The values in the illustrated embodiment are shown in the following table.

TABLE 7

| BINDINFOF Enumeration Values | |
|---|---|
| Value | Description |
| BINDINFOF_URLENCODESTGMEDDATA | Use URL encoding to pass is the data provided in the stgmedData member of the BINDINFO. (for PUT and POST operations) |
| BINDINFOF_URLENCODEEXTRAINFO | Use URL encoding to pass is the data provided in the szExtraInfo member of the BINDINFO. |

5.5.3 The BINDINFO Structure

The BINDINFO structure is returned to the asynchronous moniker 150 from the asynchronous moniker's call to the IBindStatusCallback::GetBindInfo function. The client 152 of the asynchronous moniker 150 uses this structure to qualify the bind operation. The meaning of this structure generally is specific to the class of the asynchronous moniker 150. The following table summarizes the meaning of the data values in the structure for the illustrated URL moniker class of asynchronous moniker described below.

TABLE 8

| BINDINFO Structure Members | | |
|---|---|---|
| Member | Type | Description |
| cbSize | ULONG | Size of this structure, in bytes. |
| szExtraInfo | LPWSTR | The behavior of this field is moniker-specific. For URL monikers, this string is appended to the URL when the bind operation is started. Note: like all other OLE strings, this is a Unicode string that the client should allocate using CoTaskMemAlloc. The URL Moniker will free the memory later. |
| stgmedData | STGMEDIUM | Data to be PUT or POST. |
| grfBindInfoF | DWORD | Flag from the BINDINFOF enumeration specifying additional flags modifying the bind operation. (URL specific |
| dwBindVerb | DWORD | A value from the BINDVERB enumeration specifying the action to be performed for the bind operation. |
| szCustomVerb | LPWSTR | String specifying a protocol specific custom verb to be used for the bind |

TABLE 8-continued

BINDINFO Structure Members

| Member | Type | Description |
|---|---|---|
| | | operation (only if grfBindInfoF is set to BINDINFOF_CUSTOM) |
| cbstgmedData | DWORD | size of data in stgmedData |

5.5.4 The BINDF Enumeration

The BINDF enumeration defines flags that are returned to the binding object 164 from the client's IBindStatusCallback::OnStartBinding function. The flags identify what type of binding the asynchronous moniker 150 is to perform. The flags in the illustrated embodiment are shown in the following table.

TABLE 9

BINDF Enumeration Flags

| Flag | Description |
|---|---|
| BINDF_ASYNCHRONOUS | The moniker should return immediately from IMoniker::BindToStorage or IMoniker::BindToObject. The actual result of the object bind or the data backing the storage will arrive asynchronously in calls to IBindStatusCallback::OnDataAvailable or IBindStatusCallback::OnObjectAvailable. If the client does not choose this flag, the bind operation will be synchronous, and the client will no receive any data from the bind operation until the IMoniker::BindToXXX call returns. |
| BINDF_ASYNCSTORAGE | The client of IMoniker::BindToStorage prefers that the IStorage and IStream objects returned in IBindStatusCallback::OnDataAvailable return E_PENDING when they reference data not yet available through I/O methods, rather than blocking until the data becomes available. This flag applies only to BINDF_ASYNCHRONOUS operations. |
| BINDF_PULLDATA | When this flag is specified, the asynchronous moniker will allow the client of IMoniker::BindToStorage to drive the bind operation by pulling the data, (rather than having the moniker driving the operation and pushing the data upon the client). Specifically, when this flag is chosen, new data will only be read/downloaded after the client finishes reading all data that is currently available. This means data will only be downloaded for the client after the client does an IStream::Read operation that blocks or returns E_PENDING. When the client chooses this flag, it must be sure to read all the data it can, even data that is not necessarily available yet. When this flag is not specified, the moniker will continue downloading data and will call the client with IBindStatusCallback::OnDataAvailable whenever new data is available. This flag applies only to BINDF_ASYNCHRONOUS bind operations. |
| BINDF_GETNEWESTVERSION | The moniker bind operation should retrieve the newest version of the data/object possible. |
| BINDF_NOPROGRESSIVERENDERING | If this bit is set, then only one IBindStatusCallback::OnDataAvailable notification will be generated, which will be after the whole data is downloaded. |
| BINDF_OFFLINEOPERATION | If this bit is set, the moniker code will not attempt network connection. If the data is available in the cache, then the binding operations will succeed, else they will fail. |
| BINDF_IGNORESECURITYPROBLEM | Ignore security problems and proceed with the attempt to connect and download data. |
| BINDF_RESYNCHRONIZE | Update the file in the cache if one on the server is later than the one in the cache. |

TABLE 9-continued

BINDF Enumeration Flags

| Flag | Description |
|---|---|
| BINDF_NOWRITECACHE | The moniker bind operation should not store retrieved data in the disk cache. |

5.5.5 The BSCF Enumeration

The BSCF enumeration defines flags that are passed to the client 152 by the asynchronous moniker 150 in a call to the client's IBindStatusCallback::OnDataAvailable function to clarify the type of data which is available. The flags in the illustrated embodiment are shown in the following table.

TABLE 10

BSCF Enumeration Flags

| Flag | Description |
|---|---|
| BSCF_FIRSTDATANOTIFICATION | Identifies the first call to IBindStatusCallback::OnDataAvailable for a given bind operation. |
| BSCF_LASTDATANOTIFICATION | Identifies the last call to IBindStatusCallback::OnDataAvailable for a bind operation. |
| BSCF_INTERMEDIATEDATANOTIFICATION | Identifies an intermediate call to IBindStatusCallback::OnDataAvailable for a bind operation. |

5.5.6 The BINDSTATUS Enumeration

The asynchronous moniker 150 passes a single status value from the BINDSTATUS enumeration as the ulStatusCode parameter to the IBindStatusCallback::OnProgress function to inform the client 152 about the progress of the bind operation. The status values in the illustrated embodiment are shown in the following table.

TABLE 11

BINDSTATUS Enumeration Status Values

| Status Value | Description |
|---|---|
| BINDSTATUS_FINDINGRESOURCE | The bind operation is finding the resource that holds the object or storage being bound to. The szStatus Text accompanying IBindStatusCallback::OnProgress ( ) provides the display name of the resource being searched for (e.g. "www.microsoft.com"). |
| BINDSTATUS_CONNECTING | The bind operation is connecting to the resource that holds the object or storage being bound to. The szStatus Text accompanying IBindStatusCallback::OnProgress ( ) provides the display name of the resource being connected to (e.g. "www.microsoft.com"). |
| BINDSTATUS_REDIRECTING | The bind operation has been redirected to a different data location. The szStatus Text accompanying IBindStatusCallback::OnProgress ( ) provides the display name of the new data location. |
| BINDSTATUS_BEGINDOWNLOADDATA | The bind operation has begun receiving the object or storage being bound to. The szStatus Text accompanying IBindStatusCallback::OnProgress |

TABLE 11-continued

BINDSTATUS Enumeration Status Values

| Status Value | Description |
| --- | --- |
| | ( ) provides the display name of the data location. |
| BINDSTATUS_DOWNLOADINGDATA | The bind operation continues to receive the object or storage being bound to. The szStatus Text accompanying IBindStatusCallback::OnProgress ( ) provides the display name of the data location. |
| BINDSTATUS_ENDDOWNLOADDATA | The bind operation has finished receiving the object or storage being bound to. The szStatus Text accompanying IBindStatusCallback::OnProgress ( ) provides the display name of the data location. |
| BINDSTATUS_BEGINDOWNLOADCOMPONENTS | This notification will be generated when code downloading starts. |
| BINDSTATUS_INSTALLINGCOMPONENTS | This notification will be given when the code downloading is progressing. |
| BINDSTATUS_ENDDOWNLOADCOMPONENTS | This notification will be generated when the code download is complete. |
| BINDSTATUS_USINGCACHEDCOPY | This notification will be generated if the the data is found in the cache, and that data is going be used (instead getting new data from the server). |
| BINDSTATUS_SENDINGREQUEST | Sending the http connection request to the server. |
| BINDSTATUS_CLASSIDAVAILABLE | After the moniker figures out the classid from the bits, it will generate this notification. SzStatus Text field will contain the class id in the sting form. |
| BINDSTATUS_MIMETYPEAVAILABLE | Same as above, after the moniker figures out the mime type, the notification will be generated. SzStatus Text field will contain the MIME string. |
| BINDSTATUS_CACHEFILENAMEAVAILABLE | This notification will be generated if the the data is found in the cache, and that data is going be used (instead getting new data from the server). The name of the cached file will be in the szStatus Text field |
| BINDSTATUS_BEGINSYNCOPERATION | Called when URL moniker is about to make sychronous RPC call (e.g., CoCreateInstance, IpersistMoniker::Load, etc.). This give a chance for the host application to put up busy cursor and block user input. |
| BINDSTATUS_ENDSYNCOPERATION | Called after URL moniker is done to make sychronous RPC call (e.g., CoCreateInstance, IpersistMoniker::Load, etc.). At this time the host application can remove the busy cursor and enable the user input. |

5.5.7 The IBindStatusCallback::QueryInterface Function

The asynchronous moniker 150 calls the IBindStatusCallback::QueryInterface function to query the client 152 for access to an interface which exposes additional services necessary for completing the bind operation. This function provides extensibility to the IBindStatusCallback interface, because it allows querying the client for new interfaces for passing information or querying information. The IEnumFormatEtc interface of URL monikers described below is an example of additional client services that can be made available through this function. The parameters and return values of the illustrated function are shown in the following table.

TABLE 12

IBindStatusCallback::QueryInterface Parameters and Return Values.

| Parameter | Type | Description |
| --- | --- | --- |
| riid | REFIID | The REFIID for the interface for the requested service. |
| ppvObject | void* | The interface returned by the client. |
| Returns | S_OK | Success. The interface returned is used by the moniker to communicate further information pertaining to the bind operation. |
| | E_NOINTERFACE | The client does not know how to support the requested interface. Note: if none of the callbacks registered for a particular bind operation return S_OK to this call, the bind operation will perform default action. |
| | E_OUTOFMEMORY | Out of memory. |
| | E_INVALIDARG | One of more arguments are invalid. |

5.5.8 The IBindStatusCallback::GetBindInfo Function

The asynchronous moniker 150 calls the IBindStatusCallback::GetBindInfo function to obtain information from the client 152 pertaining to the bind operation. The asynchronous moniker 150 calls this method within its implementations of the IMoniker::BindToObject and BindToStorage functions before returning. The parameters and return values of the illustrated function are shown in the following table.

TABLE 13

IBindStatusCallback::GetBindInfo Parameters and Return Values.

| Argument | Type | Description |
| --- | --- | --- |
| pgrfBINDF | DWORD* | Location to return a value taken from the BINDF enumeration which indicates whether the bind should proceed synchronously or asynchronously. |
| pbindinfo | BINDINFO* | Location to return the BINDINFO structure which describes how the caller wants the binding to occur. |
| Return | S_OK | Success. |
| | E_INVALIDARG | One or more arguments are invalid. |

5.5.9 The IBindStatusCallback::OnStartBinding Function

The asynchronous moniker 150 also calls the IBindStatusCallback::OnStartBinding function while initiating the bind operation within its implementation of the IMoniker::BindToStorage or IMoniker::BindToObject functions. In its call to this function, the asynchronous moniker 150 passes an interface pointer of the IBinding interface 160 of the binding object 164 associated with the current bind operation to the client 152. As detailed above, the IBinding interface 160 allows the client 152 to exert control over the bind operation by calling the member functions on the IBinding interface of the binding object. The client's bind-status-callback object 166 stores the IBinding interface pointer and maintains accurate reference counting by calling the standard OLE AddRef and Release functions on the IBinding interface in accordance with OLE conventions.

The parameters and return values of the illustrated IBindStatusCallback::OnStartBinding function are shown in the following table.

TABLE 14

IBindStatusCallback::OnStartBinding Parameters and Return Values.

| Argument | Type | Description |
|---|---|---|
| dwReserved | DWORD | Reserved. |
| pbinding | IBinding* | The IBinding interface of the current bind operation. May not be NULL. The client should call AddRef() on this pointer if it wishes to keep a reference to the binding object. |
| Returns | S_OK | Success. |
|  | E_INVALIDARG | The pbinding argument is invalid. |

5.5.10 The IBindStatusCallback::GetPriority Function

Typically, the asynchronous moniker 150 calls the IBindStatusCallback::GetPriority function to obtain the priority of the bind operation prior to initiating asynchronous binding by the binding object 164. Additionally, the function may be called at any time during the bind operation if the asynchronous moniker 150 needs to make new priority decisions. The asynchronous moniker 150 can use the priority to set the actual priority of a thread associated with a download operation (i.e., the thread executing the binding object 164), but more commonly the asynchronous moniker interprets the priority to perform its own scheduling among multiple bind operations. The parameter and return values of the illustrated function are shown in the following table.

TABLE 15

IBindStatusCallback::GetPriority Parameters and Return Values.

| Argument | Type | Description |
|---|---|---|
| pnPriority | LONG* | Location to return a value indicating the priority of this download. Priorities may be any of the constants defined for prioritizing threads in Microsoft's Win32 API. Default is priority normal. |
| Returns | S_OK | Success. |
|  | E_INVALIDARG | One or more arguments are invalid. |

5.5.11 The IBindStatusCallback::OnProgress Function

The binding object 164 calls the IBindStatusCallback::OnProgress function repeatedly to indicate the current progress of the bind operation, preferably at reasonable intervals during a lengthy bind operation. The client 152 may use the progress notification to provide progress information to the user, such as by displaying a "% complete" bar graph, a download status notification message or like progress indicating user interface control. The client 152 also may use the progress notification to make programmatic decisions based on the ulStatusCode parameter. The parameters and return values of the illustrated function are shown in the following table.

TABLE 16

IBindStatusCallback::OnProgress Parameters and Return Values.

| Argument | Type | Description |
|---|---|---|
| ulProgress | ULONG | Indicates the current progress of the bind operation relative to the expected maximum indicated in ulProgressMax. |
| ulProgressMax | ULONG | Indicates the expected maximum value of ulProgress for the duration of calls to OnProgress for this operation. Note that this value may change across invocations of this method. |
| ulStatusCode | ULONG | Provides additional information regarding the progress of the bind operation. Valid values are taken from the BINDSTATUS enumeration. |
| szStatusText | LPCWSTR | Information about the current progress, depending on the value of ulStatusCode as defined for the BINDSTATUS enumeration described above. |
| Returns | S_OK | Success. |
|  | E_INVALIDARG | One or more arguments are invalid. |

5.5.12 The IBindStatusCallback::OnDataAvailable Function

During asynchronous binding using the asynchronous moniker's IMoniker::BindToStorage function, the asynchronous moniker 150 calls the IBindStatusCallback::OnDataAvailable function to provide data to the client 152 as it becomes available. As described above, the behavior of the storage passed to the client 152 by the asynchronous moniker 150 in the pstgmed parameter depends on the BINDF flags that the client returned from the IBindStatusCallback::GetBindInfo function. More particularly, the storage may be asynchronous or blocking. Further, the bind operation may follow a "data pull" model or a "data push" model. For the data pull model, the client is not able to seek backwards in the data stream provided by the asynchronous moniker in the IBindStatusCallback::OnDataAvailable call. On the other hand, for push model bind operations, the client 152 commonly can seek back into a data stream and read any data that has been downloaded for an ongoing IMoniker::BindToStorage operation.

The parameters and return values of the illustrated IBindStatusCallback::OnDataAvailable function are shown in the following table.

TABLE 17

Parameters and Return Values of the IBindStatusCallback::OnDataAvailable Function.

| Argument | Type | Description |
|---|---|---|
| grfBSCF | DWORD | Values taken from the BSCF enumeration. |
| dwSize | DWORD | The amount (in bytes) of total data available from the current bind operation. |
| pfmtetc | FORMATETC* | Indicates the format of the available data when called as a result of IMoniker::BindToStorage. If there is no format associated with the available data, pformatetc may contain CF_NULL. |
| pstgmed | STGMEDIUM* | Holds the actual data that became available when called as a result of |

TABLE 17-continued

Parameters and Return Values of the
IBindStatusCallback::OnDataAvailable Function.

| Argument | Type | Description |
|---|---|---|
| | | IMoniker::BindToStorage. If it wishes to keep the data in pstgmed allocated, the client should call AddRef () on pstgmed->pUnkForRelease (if the pointer is non-NULL). |
| Returns | S_OK | Success. |
| | E_INVALIDARG | One or more arguments are invalid. |

5.5.13 The IBindStatusCallback::OnObjectAvailable Function

During asynchronous binding using the asynchronous moniker's IMoniker::BindToObject function, the asynchronous moniker 150 calls the IBindStatusCallback::OnObjectAvailable function to pass the requested object interface pointer to the client 152. The asynchronous moniker 150 never calls this function for asynchronous binding performed using the IMoniker::BindToStorage function. The parameters and return values of the illustrated IBindStatusCallback:;OnObjectAvailable function are shown in the following table.

TABLE 18

Parameters and Return Values of the
IBindStatusCallback::OnObjectAvailable Function.

| Argument | Type | Description |
|---|---|---|
| riid | REFIID | The REFIID of the requested interface. |
| punk | IUnkown* | The object pointer requested in the call to IMoniker::BindToObject. The client should call AddRef() on this pointer in order to maintain a reference to the object. |
| Returns | S_OK | Success. |
| | E_INVALIDARG | One or more arguments are invalid. |

5.5.14 The IBindStatusCallback::OnLowResource Function

The asynchronous moniker 150 calls this function when it detects low resources. The client 152 should free any resource it no longer needs when receiving this notification. The illustrated function's parameters and return values are shown in the following table.

TABLE 19

IBindStatusCallback::OnLowResource Parameters and
Return Values.

| Argument | Type | Description |
|---|---|---|
| dwReserved | DWORD | Reserved for future use. Must be zero. |
| Returns | S_OK | Success. |

5.5.15 The IBindStatusCallback::OnStopBinding Function

The asynchronous moniker 150 calls IBindStatusCallback::OnStopBinding function to indicate the end of the bind operation. This function is always called, whether the bind operation succeeded, failed, or was aborted by the client 152. When this function is called, the client 152 must call the Release function on the IBinding interface pointer it received in the asynchronous moniker's call to the IBindStatusCallback::OnStartBinding function. The parameters and return values of the illustrated IBindStatusCallback::OnStopBinding function are shown in the following table.

TABLE 20

IBindStatusCallback::OnStopBinding function

| Argument | Type | Description |
|---|---|---|
| hrStatus | HRESULT | Status code which would have been returned from the method that initiated the bind operation (IMoniker::BindToObject or IMoniker::BindToStorage). |
| szStatusText | LPCWSTR | Status text. In case of error, this string may provide additional information describing the error. In case of success, szStatusText provides the friendly name of the data location bound to. |
| Returns | S_OK | Success. |

5.6 The IPersistMoniker Interface

The object 154 which is named by the asynchronous moniker can support an IPersistMoniker interface 170 to obtain more control over the way the object is bound to its persistent data. When instantiating and initializing the named object 154 in the IMoniker::BindToObject function, the asynchronous moniker 150 queries the named object for persistence interfaces, such as the IPersistMoniker Interface 170 or the standard OLE IPersistFile, IPersistStream[Init], or IPersistStorage interfaces, which the asynchronous moniker then utilizes in the bind operation to load the object's persistent data. In the illustrated embodiment, the asynchronous moniker 150 uses the highest precedence interface supported by the object in the following order: IPersistMoniker, IPersistStream[Init], IPersistStorage, IPersistFile, IPersistMemory.

The IPersistMoniker interface 170 allows monikers and other application programs which instantiate objects from persistent data to give control to the object 154 to choose how the object is bound to its persistent data. The object 154 can implement a IPersistMoniker::Load function (described below) with code that calls IMoniker::BindToStorage on a moniker that names the object's persistent state and specifies a preferred interface and binding options, such as IStorage, IStream, asynchronously bound, etc.

The IPersistMoniker interface 170 is defined as follows:

```
//+-----------------------------------------
//
// Copyright (C) Microsoft Corporation, 1995–1996.
//
// Contents: IPersistMoniker interface definition
//
//------------------------------------------
ccp_quote("#ifndef _LPPERSISTMONIKER_DEFINED")
cpp_quote("#define _LPPERSISTMONIKER_DEFINED")
[
    object,
    uuid(79eac9c9-baf9-11ce-8c82-00aa004ba90b),
    pointer_default(unique)
]
interface IPersistMoniker : IUnknown
{
    typedef [unique] iPersistMoniker *LPPERSISTMONIKER;
    HRESULT GetClassID(
        [out] CLSID *pClassID
    );
    HRESULT IsDirty(void):
    HRESULT Load(
        [in] BOOL fFullyAvailable,
        [in] IMoniker * pimkName,
        [in] LPBC pibc,
```

```
        [in] DWORD grfMode
        ):
    HRESULT Save(
        [in] IMoniker * pimkName,
        [in] LPBC pbc,
        [in] BOOL fRemember);
    HERESULT SaveCompleted(
        [in] IMoniker * pimkName,
        [in] LPBC pibc):
    HRESULT GetCurMoniker(
        [out] IMoniker ** ppimkName):
}
cpp_quote("#endif")
```

5.6.1 The IPersistMoniker::IsDirty Function

The IPersistMoniker::IsDirty function checks whether the persistent state of the object has changed since it was last saved. The illustrated function's return values are shown in the following table.

TABLE 21

IPersistMoniker::IsDirty Return Values.

| Argument | Type | Description |
| --- | --- | --- |
| Returns | S_OK | Yes, the object has changed since it was last saved. |
|  | S_FALSE | No, the object has not changed since it was last saved. |

5.6.2 The IPersistMoniker::Load Function

The IPersistMoniker::Load function loads the object with its persistent state referred to by a parameter, pmkSrc. If the fFullyAvailable argument is true, the implementation of the IPersistMoniker::Load function in the illustrated object immediately binds to its persistent state with the call, pmkSrc->BindToStorage(pbc, . . . ), specifying either IStream or IStorage as the interface pointer parameter of the call. Otherwise, if the fFullyAvailable argument is set to false, the object's response to the call depends on whether the object supports binding to its persistent state while the data for that state is still in the process of being downloaded to the storage object. If so, the object's implementation of this function binds to its persistent state by calling the BindToStorage function of the moniker specified in the pmkSrc argument as in the case where the fFullyAvailable argument is true. Otherwise, the object's implementation of this function returns the value "S_FALSE."

The following table summarizes the parameters and return values of the illustrated IPersistMoniker::Load function.

TABLE 22

IPersistMoniker::Save Parameters and Return Values.

| Argument | Type | Description |
| --- | --- | --- |
| fFullyAvailable | BOOL | The data referred to by the moniker has already been loaded once, subsequent binding to the moniker should be very fast. |
| pmkSrc | IMoniker* | A reference to the persistent state to initialize this object from. |
| pbc | IBindCtx* | The bind context to use for any moniker binding during this method. |
| grfMode | DWORD | A combination of the values from the STGM enumeration which indicate the access mode to use when binding to the persistent state. The |

TABLE 22-continued

IPersistMoniker::Save Parameters and Return Values.

| Argument | Type | Description |
| --- | --- | --- |
|  |  | IPersistMoniker::Load method can treat this value as a suggestion, adding more restrictive permissions if necessary. If grfMode is zero, the implementation should bind to the persistent state using default permissions. |
| Returns | S_OK | Success. |
|  | S_FALSE | The object requires that the data be fully available. |
|  | E_INVALIDARG | One or more arguments are invalid. |

5.6.3 The IPersistMoniker::Save Function

The IPersistMoniker::Save function is called to request that the object 154 save itself into the location referred to by the moniker pointer parameter, pmkDst. The illustrated function's parameters and return values are shown in the following table.

TABLE 23

IPersistMoniker::Save Parameters and Return Values.

| Argument | Type | Description |
| --- | --- | --- |
| pmkDst | IMoniker* | Moniker to the location where the object should persist itself. The object typically binds to the location using pmkDst->BindToStorage for either IStream or IStorage. May be NULL, in which case the object is requested to save itself to the same location referred to by the moniker passed to it in IPersistMoniker::Load. This may act as an optimization to prevent the object from binding, since it has typically already bound to the moniker it was loaded from. |
| pbc | IbindCtx* | The bid context to use for any moniker binding during this method. |
| fRemember | BOOL | Indicates whether pmkDst is to be used as the reference to the current persistent state after the save. If TRUE, pmkDst becomes the reference to the current persistent state and the object should clear its dirty flag after the save. If FALSE, this save operation is a "Save A Copy As ..." operation. In this case, the reference to the current persistent state is unchanged and the object should not clear its dirty flag. If pmkDst is NULL, the implementation should ignore the fRemember flag. |
| Returns | S_OK | Success. |
|  | E_INVALIDARG | One or more arguments are invalid. |

5.6.4 The IPersistMoniker::SaveCompleted

Calling this function notifies the object that it has been completely saved and points the object to its new persisted state. The implementation of this function in the illustrated object 154 immediately bind to the object's persistent state using the code, pmkNew->BindToStorage(pbc, . . . ), and specifying either IStream or IStorage, as in the implementation of IPersistMoniker::Load function. The parameters and return values of the illustrated IPersistMoniker::SaveCompleted function are shown in the following table.

TABLE 24

IPersistMoniker::SaveCompleted Parameters and Return Values.

| Argument | Type | Description |
|---|---|---|
| pmkNew | IMoniker* | The moniker to the object's new persistent state, or NULL as an optimization if the moniker to the object's new persistent state is the same as the previous moniker to the object's persistent state - only allowed if there was a prior call to IPersistMoniker::Save with fRemember=TRUE - in which case the object need not rebind to pmkNew. |
| pbc | IBindCTX* | The bind context to use for any moniker binding during this method. |
| Returns | S_OK | Success. |
|  | E_INVALIDARG | One or more arguments are invalid. |

5.6.5 The IPersistMoniker::GetCurMoniker Function

This function is used to retrieve the moniker that refers to the object's persistent state. Typically, this is the moniker last passed to the object via IPersistMoniker::Load, IPersistMoniker::Save or IPersistMoniker::SaveCompleted. The parameter and return values of the illustrated IPersistMoniker::GetCurMoniker function are shown in the following table.

TABLE 25

IPersistMoniker::GetCurtMoniker Parameter and Return Value.

| Argument | Type | Description |
|---|---|---|
| ppmkCur | IMoniker** | Location to return the moniker to the object's current persistent state. |
| Returns | S_OK | Success. |
|  | E_INVALIDARG | The ppmkCur argument is invalid. |

5.7 API Functions for Asynchronous Monikers

For use in asynchronous binding using the asynchronous moniker 150, the system 158 provides several API functions described below.

5.7.1 The CreateAsyncBindCtx API Function

The system 158 provides a CreateAsyncBindCtx API function having the following form:

HRESULT CreateAsyncBindCtx(dwReserved, pbsc, dwReserved, penumfmtetc, ppbc);

The client 152 calls the CreateAsyncBindCtx API function to create an asynchronous bind context for use with the asynchronous moniker 150. The CreateAsyncBindCtx API function automatically registers the IBindStatusCallback interface 162 and the IEnumFORMATETC interface (described below) with the asynchronous bind context.

The parameters and return values of the illustrated CreateAsyncBindCtx API function are shown in the following table.

TABLE 26

CreateAsyncBindCtx API Function Parameters and Return Values.

| Argument | Type | Description |
|---|---|---|
| dwReserved | DWORD | Reserved for future use. Must be zero. |
| pbsc | IBindStatusCallback* | The callback to receiving data availability and progress notification. |
| dwReserved | DWORD | Reserved. |
| penumfmtetc | IEnumFORMATETC* | Enumerator of formats to use for format negotiation during binding, if applicable. May be NULL, in which case the caller is not interested in format negotiation during binding and the default format of the object will be bound to. |
| ppbc | IBindCtx** | Location to return the new bind-context. |
| Returns | S_OK | Success. |
|  | E_OUTOFMEMORY | Out of memory. |
|  | E_INVALIDARG | One or more arguments are invalid. |

5.7.2 The RegisterBindStatusCallback API Function

The system 158 provides a RegisterBindStatusCallback API function having the following form.

HRESULT RegisterBindStatusCallback(pbc, pbsc, dwReserved, dwReserved);

The client 152 call the RegisterBindStatusCallback API function to register its IBindStatusCallback interface with an existing bind context. The RegisterBindStatusCallback API function also allows the client to specify flags that determine which callback notifications the client is capable of receiving. The client may implement functions for callback notifications that it does not receive as empty function stubs (returning E_NOTIMPL).

This API function allows a single client at a time to register a callback for a same bind context. The API function outputs an interface pointer of a callback interface (if any) which was previously registered for the same bind context. The client utilizes the previously registered callback interface to chain callback notifications to other clients which had registered to receive callback notifications from the bind context.

The parameters and return values of the RegisterBindStatusCallback API function in the illustrated embodiment are shown in the following table.

TABLE 27

RegisterBindStatusCallback API Function Parameters and Return Values.

| Argument | Type | Description |
|---|---|---|
| pbc | IBindCtx* | The bind context to register the call back with. |
| pbsc | IBindStatusCallback* | The callback interface to register. |
| dwReserved | DWORD | Reserved. |
| dwReserved | DWORD | Reserved for future extension. |
| Returns | S_OK | Success. |
|  | E_OUTOFMEMORY | Insufficient memory to register the callback with the bind context. |
|  | E_INVALIDARG | One or more arguments are invalid. |

5.7.3 The RevokeBindStatusCallback API Function

The system 158 provides a RevokeBindStatusCallback API function having the following form.

HRESULT RevokeBindStatusCallback( );

The client 152 calls the RevokeBindStatusCallback API function to revoke a previous IBindStatusCallback interface registration in the asynchronous bind context. This call will not succeed if it is made during a bind operation.

TABLE 28

RevokeBindStatusCallback API Function Parameters and Return Values.

| Argument | Type | Description |
| --- | --- | --- |
| pbc | IBindCtx* | The bind context to revoke the callback from. |
| pbsc | IBindStatusCallback* | The callback interface to revoke. |
| Returns | S_OK | Success. |
|  | E_FAIL | The IBindStatusCallback is not registered on the bind context. |
|  | E_INVALIDARG | One or more arguments are invalid. |

5.7.4 The IsAsyncMoniker API Function

The system 158 provides an IsAsyncMoniker API function having the following form.

HRESULT IsAsyncMoniker(pmk);

By calling this API, the client 152 tests whether a moniker supports asynchronous binding. The illustrated asynchronous moniker 150 implementation indicates that it is asynchronous by supporting an IMonikerAsync interface, an "empty" interface which is actually just IUnknown, having the following form.

```
MyCustomMoniker::QueryInterface(REFIID riid, void** ppv) {
    if (riid == IID_IUnknown || rid == IID_IPersistStream || riid
        == IID_IMoniker || riid == IID_IAsyncMoniker) {
        *ppv = this;
        AddRef();
        return S_OK;
    }
    *ppv = NULL;
    return E_NOINTERFACE;
}
```

The implementation of the IsAsyncMoniker API function tests support for this interface by the moniker to determine if it is asynchronous. The parameter and return values of the illustrated IsAsyncMoniker API function are shown in the following table.

TABLE 29

IsAsyncMoniker API Function Parameter and Return Values.

| Argument | Type | Description |
| --- | --- | --- |
| pmk | IMoniker* | The moniker to test. |
| Returns | S_OK | Yes, the moniker is asynchronous. |
|  | S_FALSE | No, the moniker is not asynchronous. |
|  | E_INVALIDARG | The pmk argument is invalid. |

6. URL Monikers

According to the illustrated embodiment of the invention shown in FIG. 7, a client program (hereafter "client") 202 utilizes an URL moniker 200 provided by an operating system component (hereafter "system") 204 (specifically a component such as the COM library 114 which also implements the API functions described above for asynchronous monikers and the API functions described below for URL monikers) to asynchronously bind to an object 208 named by an uniform resource locator (URL). URLs are a well known encoding of names and addresses of resources (e.g., documents, images, and other data) residing on the Internet. URLs generally comprise a transport protocol identifier (e.g., "http," "ftp," "gopher," etc.), a site name (e.g., "www.microsoft.com"), and a resource name (e.g., "document.html"), such as the following text string example: "http://www.microsoft.com/intdev/page.html." URLs are described in more detail in the following documents currently available from the Internet: *Uniform Resource Locators (URL)*, http://ds.internic.net/rfc/rfc1738.txt; *Relative Uniform Resource Locators*, http://ds.internic.net/rfc/rfc11808.txt; *Universal Resource Identifiers in WWW (RFC1630)*, http://ds.internic.net/rfc/rfc1630.txt; *Names and Addresses, URIs, URLs, URNs, URCs*, http://www.w3.org/pub/WWW/Addressing/Addressing.html; and *IETF—Hypertext Transfer Protocol (HTTP) Working Group*, http://www.ics.uci.edu/pub/ietf/http.

The URL moniker 200 is an instance of a class derived from the asynchronous moniker class, and supports the IMoniker interface 124. Since the IMoniker interface 124 is derived from the IPersistStream interface, the URL moniker 200 also supports the IPersistStream, IPersist, and IUnknown interfaces (which are standard OLE interfaces). Also, as described above for the asynchronous moniker 150, the URL moniker 200 supports the IAsyncMoniker interface which is a stub interface that is used to allow the client 202 to determine whether the moniker supports asynchronous binding (which the URL moniker does).

In an asynchronous bind operation, the URL moniker 200 makes use of a transport object 210 which supports the IBinding interface 152 and implements an Internet transport protocol (e.g., HTTP, FTP, Gopher or other transport protocol) associated with the URL of the URL moniker. The illustrated transport object 210 is provided by the system 204, and additionally supports an IBindProtocol interface 212, the IParseDisplayName interface (described above), and protocol specific interfaces 214 which may be required for interacting with other operating system components involved in downloading data from the Internet (e.g., the "WinSock" or "WinInet" layer of the Windows® 95 operating system).

To support asynchronous binding, the client 202 implements the bind-status-callback object 166 which supports the IBindStatusCallback interface 162, and registers the IBindStatusCallback interface 162 with the asynchronous bind context 156. The illustrated client 202 additionally implements a format enumerator object 220 which supports an IEnumFORMATETC interface 222 for media-type negotiation (described more fully below). The client 202 also registers the IEnumFORMATETC interface 222 with the asynchronous bind context 156.

The client 202 makes use of the URL moniker 200 in a way generally similar to the use of the asynchronous moniker 150 described above. The client 202 creates the asynchronous bind context 156 with a call to the CreateAsyncBindCtx API function (described above) of the system component 204, and registers the IBindStatusCallback interface 162 of its bind-status-callback object 166 in the asynchronous bind context 156 with flags specifying which callback notifications the bind-status-callback object receives from the URL moniker. The client 202 also creates the URL moniker 200, such as by calling the CreateURLMoniker API function (described below) or the MkParseDisplayName API function of the system 204. From creating the asynchronous bind context 156 and the URL moniker 200, the client 202 obtains pointers to the IBindCtx interface 128 and the IMoniker interface 124 which the client stores as pbc and pmk pointer variables 134, 136. The client 202 then calls the IMoniker::BindToObject or IMoniker::BindToStorage functions of the URL moniker and passes an interface pointer of the IBindCtx interface 128 of the asynchronous bind context 156 to the URL moniker 200 to initiate binding to the object named by the URL moniker 200.

In the URL moniker's IMoniker::BindToObject or BindToStorage function, the URL moniker 200 identifies the Internet protocol associated with the URL according to the transport prefix of the URL, and retrieves the IBinding interface 160 of the transport object 210 which implements the associated Internet protocol. The URL moniker 200 also looks up the IBindStatusCallback interface 162 of the bind-status-callback object 166 registered by the client 202 in the asynchronous bind context 156. The URL moniker 200 then passes an interface pointer of the IBinding interface 160 to the bind-status-callback object 166 in a call to the OnStartBinding function on the IBindStatusCallback interface 162. As described above, the client calls functions on the IBinding interface 160 to effect pausing, cancellation, and prioritization of the asynchronous binding operation.

The URL moniker 200 also passes its pointer for the IBindStatusCallback interface 162 to the transport object 210 when initiating the bind operation. During the bind operation, the transport object 210 calls notification functions on the IBindStatusCallback interface 162. In particular, the bind-status-callback object 166 receives progress notification through the IBindStatusCallback::OnProgress function, data availability notification through the IBindStatusCallback::OnDataAvailable function, as well as various other notifications from the transport object 210 about the status of the bind operation.

The URL moniker 200 or transport object 210 may also request extended information from the client 202 via the IBindStatusCallback::QueryInterface function, allowing the client 202 to provide protocol-specific information that will affect the bind operation.

6.1 Media-type Negotiation with the URL Moniker

The URL moniker 200 supports media type negotiation in order to allow clients to negotiate the format of the named object's data to be downloaded in the URL's BindToStorage function (i.e., where the URL moniker downloads the named object's data directly into the computer's secondary storage 42 (FIG. 1), rather than loading the data into the running object 208). The client 202 requests preferred data format(s) using the IEnumFORMATETC interface 222 on the format enumerator object 220. The client 202 creates the format enumerator object 220, and registers the IEnumFORMATETC interface 222 with the asynchronous bind context 156. The client registers the IEnumFORMATETC interface 222 in a call to the CreateAsyncBindCtx API function (described above), or with the RegisterFormatEnumerator API function (described below) as shown in the following example code:

CreateBindCtx(0, &pbc);

RegisterFormatEnumerator(pbc, &enumfmtetc, 0);

The URL moniker 200 obtains an interface pointer to the IEnumFORMATETC interface 222 from the asynchronous bind context 156 when performing a bind operation in the IMoniker::BindToStorage or BindToObject functions. The URL moniker 200 then calls functions on the IEnumFORMATETC interface 222 to obtain the client's preferred data format(s). The client 202 represents the requested preferred format(s) to the URL moniker 200 through FORMATETC data structures (described below) in the format enumerator object 220 which the client makes available from the IEnumFORMATETC interface 222.

Each FORMATETC data structure specifies a clipboard format value identifying a preferred data format (media type), a "NULL" target device value, a "DVASPECT_CONTENT" value, a "Iindex" value of −1, and a "TYMED_NULL" value. The clipboard format values are value used by the well known OLE Clipboard protocol for exchanging data between two programs, such as in cut/copy/paste or drag-and-drop operations between programs. An example of code for creating a FORMATETC data structure in the client 202 follows:

```
FORMATEWTC       fmtetc;
fmtetc.cfFormat =
    RegisterClipboardFormat(CF_MIME_POSTSCRIPT);
fmtetc.ptd = NULL;
fmtetc.dwAspect = DVASPECT_CONTENT;
fmtetc.lindex = −1;
fmtetc.tymed = TYMED_NULL;
```

A special clipboard format value, "CF_NULL", can be used by the client 202 in a FORMATETC data structure to indicate that the default media type of the resource pointed to by the URL should be retrieved. Although the FORMATETC data structure with the CF_NULL clipboard format value can be placed anywhere within the enumerator, the client 202 generally lists such a FORMATETC data structure as last in order of priority of the client's preferred data formats.

When no FORMATETC enumerator 220 is registered with the asynchronous bind context 156 (which is a common case), the URL moniker 200 operates as if an enumerator containing a single FORMATETC with a clipboard format value equal to CF_NULL is available. More specifically, the URL moniker 200 will automatically bind to or download the default media-type of the resource named by the URL.

When performing a bind operation for the client 202, the URL moniker 200 translates the preferred data format(s) specified in the FORMATETC data structures into Multipurpose Internet Mail Extension (MIME) media types. MIME is a well known protocol for electronic mail exchange on the Internet. Many application-level Internet protocols are based on the exchange of messages using MIME media types. MIME was originally developed for exchanging electronic mail messages with rich content across heterogeneous networking, machine, and e-mail environments. MIME has since been adopted in numerous non-mail applications, and several of its useful core features extended by further protocols, such as *HyperText Transfer Protocol* (HTTP) used on the world wide web. Further details of MIME and its use in HTTP are described in the following documents available from the Internet: *MIME Overview*, http://ds.internic.net/rfc/rfc1630.txt; *Media Type Registration Procedure*, http://ds.internic.net/rfc/rfc1590.txt; and *IETF— Hypertext Transfer Protocol* (HTTP) Working Group, http://www.ics.uci.edu/pub/ietf/http.

The URL moniker 200 uses the MIME media types to request downloading the data named by the URL using the highest priority of the client's preferred data formats in which the data is available from its site on the Internet. MIME media types are simple strings which denote a type and subtype (such as "text/plain" or "text/html") and are used to label data or qualify a request. In general, the URL moniker 200 lists media types in the client's priority order, and the Internet server (or world wide web site) where the data resides responds with the highest priority available data format. For example, when the URL moniker is binding to a URL of an image which specifies the HTTP protocol, the transport object 210 lists as part of an HTTP request-for-data (Get Request-Line) or request-for-info (Head Request-Line) that it is requesting "image/gif" or "image/jpeg" MIME media types. If the data is available in the image/gif data format, the world wide web site for the URL responds by returning the MIME media type of "image/gif" and optionally the image data itself in the GIF format if the call was a request-for-data.

The client 202 is notified of the actual data format that it receives during the bind operation of the BindToStorage function through the pformatetc argument on the client's IBindStatusCallback::OnDataAvailable function.

6.1.1 The RegisterMediaTypes API Function

This API function registers text strings of MIME media types with corresponding clipboard format values for use in clipboard format value to MIME media type mapping by the URL moniker 200 in media type negotiation for the client 202. The RegisterMediaTypes API function has the following form:

HRESULT RegisterMediaTypes(ctypes, rgszTypes, rgcfTypes);

The parameters and return values of the RegisterMediaTypes API function are shown in the following table.

TABLE 30

RegisterMediaTypes API Function Parameters and Return Values.

| Argument | Type | Description |
| --- | --- | --- |
| ctypes | UINT | The number of media type strings in the rgszTypes array. May not be zero. |
| rgszTypes | LPTSTR* | Array of strings identifying the media types to be registered. None may be NULL. |
| rgcfTypes | CLIPFORMAT* | An array of 32-bit values that should be assigned to the corresponding media types in rgszTypes. |
| Returns | S_OK | Success. |
|  | E_INVALIDARG | One or more arguments are invalid. |

6.1.2 The CreateFormatEnumerator API Function

This function creates an object which implements the IEnumFORMATETC interface over a static array of FORMATETC data structures. The client 202 can call this API function to create the format enumerator object 220 for use in media type negotiation with the URL moniker 200. The CreateFormatEnumerator API function has the following form:

HRESULT CreateFormatEnumerator(cfmtetc, rgfmtetc, ppenumfmtetc);

The parameters and return values of the CreateFormatEnumerator API function are shown in the following table.

TABLE 31

CreateFormatEnumerator API Function Parameters and Return Values.

| Argument | Type | Description |
| --- | --- | --- |
| cfmtetc | UINT | The number of FORMATETCs in rgfmtetc. May not be zero. |
| rgfmtetc | CLIPFORMAT* | Static array of formats. |
| ppenumfmtetc | IEnumFORMATETC** | Location to return the IEnumFORMATETC interface of the enumerator. |
| Returns | S_OK | Success. |
|  | E_INVALIDARG | One or more arguments are invalid. |

6.1.3 The RegisterFormatEnumerator API Function

The client 202 calls this API function to register the format enumerator object 220 onto the bind context 156. This allows the URL moniker 200 to query for the client's preferred data formats for media type negotiation in a subsequent bind operation as described above. The RegisterFormatEnumerator API function has the following form:

HRESULT RegisterFormatEnumerator(pbc, pEFetc, dwReserved);

The parameters and return value of the RegisterFormatEnumerator API function are shown in the following table.

TABLE 32

RegisterFormatEnumerator API Function Parameters and Return Values.

| Argument | Type | Description |
| --- | --- | --- |
| pbc | LPBC | The pointer to the bind context. |
| pEFetc | IEnumFORMATETC* | The format enumerator. |
| dwReserved | DWORD | Reserved for future use, must be zero. |
| Returns | S_OK | Success. |
|  | E_INVALIDARG | One or more arguments are invalid. |

6.1.4 The RevokeFormatEnumerator API Function

The client 202 calls this API function to removes the format enumerator object 220 from registration with the asynchronous bind context 156. The API function has the following form:

HRESULT RevokeFormatEnumerator(pbc, pEFetc);

The parameters and return values of the RevokeFormatEnumerator API function are shown in the following table.

TABLE 33

RevokeFormatEnumerator API Function Parameters and Return Values.

| Argument | Type | Description |
| --- | --- | --- |
| pbc | LPBC | The pointer to the bind context. |
| pEFetc | IEnumFORMATETC* | The format enumerator. |
| Returns | S_OK | Success - the format |

TABLE 33-continued

RevokeFormatEnumerator API Function Parameters and Return Values.

| Argument | Type | Description |
|---|---|---|
| | E_INVALIDARG | enumerator was removed. One or more arguments are |

6.1.5 The CreateURLMoniker API Function

The client 202 calls this function to create the URL moniker 200 from a given URL. The function also can be called from a ParseDisplayName function called through the IParseDisplayName interface described above. The CreateURLMoniker API function has the following form:

HRESULT CreateURLMoniker(pmkContext, szURL, ppmk);

The CreateURLMoniker API function creates the URL moniker 200 from either a full URL string or from a partial URL string. The partial URL string identifies a resource on the Internet relative to a base context. The full URL string identifies a resource independent of any context. The caller can create the URL moniker to name a partial URL string by specifying a separate URL moniker that names the base context as the pmkContext parameter. In this case, the CreateURLMoniker API function retrieves the display name of the base context URL moniker by calling the IMoniker::GetDisplayName function on the base context URL moniker, and then manually composes the base context together with the partial URL string specified in the szURL parameter according to URL composition rules.

The caller alternatively can create the URL moniker 200 from a partial URL string without specifying the base context (i.e., with pmkContext=NULL). In such case, the URL moniker 200 will draw further context during binding (i.e., in the IMoniker::BindToObject and IMoniker::BindToStorage functions) from the asynchronous bind context 156. The URL moniker 200 obtains the base context by looking for a contextual URL moniker parameter held by the asynchronous bind context 156, such with the function call, IBindCtx::GetObjectParam(SZ_URLCONTEXT, (IUnknown**)&pmkContext). The base context can be contained as a set of URL monikers which form a composite moniker (a well known type of OLE moniker), in which case the URL moniker 200 continues looking at each URL moniker to the left of the first URL moniker obtained from the IBindCtx::GetObjectParam function call to complete the base context.

The parameters and return values of the CreateURLMoniker API function are shown in the following table.

TABLE 34

CreateURLMoniker API Function Parameters and Return Values.

| Argument | Type | Description |
|---|---|---|
| pmkContext | IMoniker* | The URL to use as the base context when szURL is a partial URL string. NULL when szURL is a full URL string or if this moniker will retrieve full URL context from its left or from the bind-context during |
| szURL | LPWSTR | IMoniker::BindToObject or IMoniker::BindToStorage. The display name to be parsed. |
| ppmk | IMoniker** | Location to return a moniker if successful, |
| Returns | S_OK | Success. |
| | E_OUTOFMEMORY | Out of memory. |
| | MK_E_SYNTAX | A moniker could not be created because szURL does not correspond to valid URL syntax for a full or partial URL. This is uncommon, since most parsing of the URL occurs during binding and also since the syntax for URLs is extremely flexible. |

6.2 URL Moniker Functions

The implementation of the member functions of the URL moniker 200 is described in further detail below. These functions have the form defined for the member functions of the IUnknown, IAsyncMoniker, IPersist, IPersistStream, and IMoniker interfaces which are described above or are well known OLE interfaces described in *Inside Ole, Second Edition,* supra.

6.2.1 The URL Moniker-IUnknown::QueryInterface Function

The client 202 uses this function to request an interface pointer of another of the OLE moniker's interfaces. The URL Moniker 200 supports the interfaces, IUnknown, IAsyncMoniker, IPersist, IPersistStream, and IMoniker. As described above, the IAsyncMoniker interface is a stub interface having no member functions that is used to allow the client 202 to determine transparently if the URL moniker 200 supports asynchronous binding. This function has the form of the standard OLE IUnknown::QueryInterface function.

6.2.2 The URL Moniker-IPersist::GetClassID Function

This function returns the class identifier of the URL moniker's class, CLSID_StdURLMoniker. This function has the form of the standard OLE IPersist::GetClassID function.

6.2.3 The URL Moniker-IPersistStream::IsDirty Function

The client 202 calls this function to check whether the URL held by the URL moniker 200 has changed since the URL moniker was last saved to the computer's secondary storage 42 (FIG. 1). The implementation of this function in the URL moniker 200 returns the value, S_OK, if the URL Moniker 200 has changed since it was last saved (i.e., with a call to the IPersistStream::Save function described below, with the parameter fClearDirty==TRUE). Otherwise, the function returns the value, S_FALSE. This function has the form of the standard OLE IPersistStream::IsDirty function.

6.2.4 The URL Moniker-IPersistStream::Load Function

This function initializes the URL moniker 200 from data (a URL string) stored within a stream. The stream usually is stored previously using the URL moniker's IPersistStream::Save function described below (via OleSaveToStream or OleSaveToStreamEx). The binary format of the stream is the URL string in Unicode™, which is a well known fixed width 16-bit encoding standard of international character sets. The URL string may be a full or partial URL string as described above in connection with the CreateURLMoniker API function. The URL string is represented as a ULONG (32-bit) data type value indicating a count of characters followed by that many Unicode characters. This function has the form of the standard OLE IPersistStream::Load function.

6.2.5 The URL Moniker-IPersistStream::Save Function

This function saves the URL named by the URL moniker 200 to a data stream in the computer's secondary storage 42 (FIG. 1). The function saves the URL in a binary format comprising a ULONG (32-bit) data type value indicating a count of characters in the URL followed by that many Unicode™ characters. As described above, the URL may be a full or partial URL string. This function has the form of the standard OLE IPersistStream::Save function.

6.2.6 The URL Moniker-IPersistStream::GetSizeMax Function

This function returns the maximum number of bytes in the data stream in which a subsequent call to the IPersistStream::Save function stores the URL of the URL moniker 200. The function computes the maximum bytes value as SIZEOF (ULONG)==4 plus SIZEOF(WCHAR)*n, where n is the length of the full or partial URL string including the NULL terminator character. The function has the form of the standard OLE IPersistStream::GetSizeMax function.

6.2.7 The URL Moniker-IMoniker::BindToObject Function

This function has the form of the standard OLE IMoniker::BindToObject function, and implements the URL moniker's binding process which instantiates the named object 208 as a running object in the computer's main memory 40 (FIG. 1). In the same manner as the asynchronous moniker 150 described above, the URL moniker 200 supports asynchronous and synchronous binding as determined by the client setting the BINDF_ASYNCHRONOUS flag passed in response to the URL moniker's IBindStatusCallback::GetBindInfo function call.

Figure 8A:
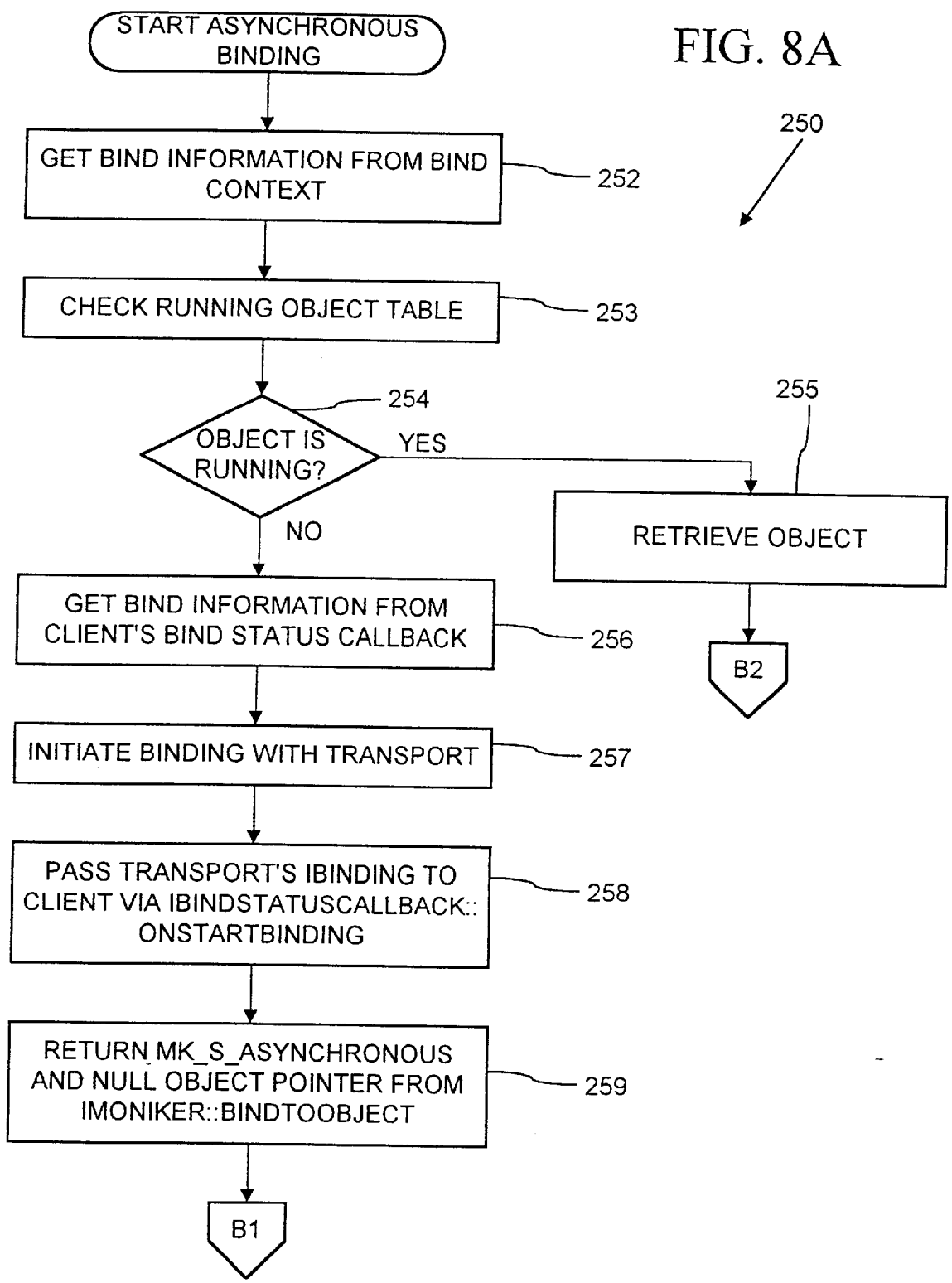

FIGS. 8A–8B show the asynchronous binding process 250 implemented in the IMoniker::BindToObject function of the URL moniker 200 (which the URL moniker performs when the BINDF_ASYNCHRONOUS flag is set). At a first step 252, the URL moniker 200 gets information for use in the bind operation from the asynchronous bind context 156, including particularly pointers for the IBindStatusCallback interface 166 and the IEnumFORMATETC interface 222 which are registered by the client 202 in the asynchronous bind context.

In a next step 253, the URL moniker 200 checks the running object table of the asynchronous bind context 156 to determine if the object 208 named by the URL moniker is already running, such as with the following code statements:

```
IBindCtx::GetRunningObjectTable(&prot);
prot- > IsRunning(this);
```

If the named object 208 is already running, the URL moniker 200 retrieves the running named object 208 at step 254 (such as with the code statement: prot->GetObject(this, &punk)), and continues to step 270 of FIG. 8B.

Otherwise, the URL moniker 200 proceeds to query the client 202 for bind information by calling the IBindStatusCallback::GetBindInfo function at step 256. In this bind information, the client 202 indicates that the bind operation is to be performed asynchronously by setting the BINDF_ASYNCHRONOUS flag. At step 257, the URL moniker 200 then initiates the bind operation with the transport object 210 according to the bind information specified by the client. The URL moniker 200 selects the transport object which implements the transport protocol specified in the URL prefix (e.g., an HTTP transport object for an URL with the prefix, "http:\\"). The transport object 210 begins retrieving the resource designated by the URL, such as by connecting to the URL's site on the Internet, and requesting the resource. The illustrated transport object 210 retrieves the resource to a stream object which supports the standard OLE interface, IStream.

The URL moniker 200 also passes an interface pointer of the transport object's IBinding interface to the client 202 at step 258 via the client's IBindStatusCallback::OnStartBinding function. Finally at step 259, the IMoniker::BindToObject function of the URL moniker 200 returns the value, MK_S_ASYNCHRONOUS, to the client 202, with NULL as the ppv output parameter. (The URL moniker only returns MK_S_ASYNCHRONOUS and performs asynchronous binding if the client has requested asynchronous binding by setting the BINDF_ASYNCHRONOUS flag as shown at step 256 and described above.) The remaining steps 260–271 of FIG. 8B are executed asynchronously (i.e., without blocking the client's execution) in the URL moniker's transport object 210.

At step 260, the class (i.e., CLSID) associated with the resource designated by the URL Moniker 200 is determined in one of several ways. In the case of the HTTP transport protocol, the initial HTTP response packet header that the transport object 210 receives when requesting the resource from its Internet site may contain the CLSID associated with the resource as an "Extension-Header" to the "Entity Header" section of the "Full-Response" message. The CLSID in the HTTP response packet header is a character string having the following form:

---

CLSID = "CLSID" ":" *stringized-slsid*

--- where stringized-clsid is a character string created using the StringFromCLSID API function. The transport object 210 interprets the stringized-clsid using the CLSIDFromString API function. The StringFromCLSID and CLSIDFromString API functions are well known OLE API functions. The extension header of the HTTP response packet is described in more detail in the following documents available from the Internet: *Hypertext Transfer Protocol—HTTP* 1.0, http://www.ics.uci.edu/pub/ietf/http/draft-ietf-http-v10-spec-04.html; *IETF—Hypertext Transfer Protocol (HTTP) Working Group*, http://www.ics.uci.edu/pub/ietf/http.

The URL moniker 200 also can determine the class associated with the URL by examining the MIME media type of the resource. If the resource has the media type, "application/x-oleobject," then the first 16-bytes of the resource's actual (i.e., non-header) data (termed the "Content-Body") contain the CLSID associated with the resource, and subsequent data of the Content-Body is to be interpreted by the class identified by the CLSID. For all other media types, the URL moniker 200 looks in the system registry for the key, HKEY_CLASSES_ROOT\MIME\Database\Content-Type\<media-type>\CLSID, where <media-type> is the resource's media type and "CLSID" is the CLSID associated with that media type.

The URL moniker 200 can further determine the CLSID of the URL designated resource's class by matching portions of arriving data to patterns registered in the system registry under the keys, HKEY_CLASSES_ROOT\FileTypes, as is well known in OLE and used in the GetClassFile API function.

Finally, if the above techniques fail, the URL moniker correlates the trailing extension of the resource's name (e.g., ".gif," ".html," ".doc," ".vsd," etc.), if any, to a CLSID using the HKEY_CLASSES_ROOT\.xxx keys in the system registry, as is also well known in OLE and used in the GetClassFile API function and by the Windows® operating system shell program.

Next, at step 261, the URL moniker 200 creates the named object 208 based on the resource's CLSID using the CoCreateInstance API function, and requesting the IUnknown interface. The URL Moniker 200 then calls the QueryInterface function on the IUnknown interface of the object 208 to obtain the highest level IPersistxxx interface supported by the object (i.e., in the order IPersistMoniker, IPersistStream, and IPersistFile) as shown at steps 262, 263, 266 and 268.

If the object 208 supports the IPersistMoniker interface 170, the URL moniker calls the objects's IPersistMoniker::Load function and specifies itself as that function's moniker parameter (e.g., by passing the pointer, "this," as the "pmkSrc" parameter) at step 264. If the transport object 210 has already completed retrieval of the resource (i.e., the object's persistent state data), the URL moniker sets the "fFullyAvailable" argument of the Load function to TRUE. Otherwise, where the transport object is still in the process of retrieving the resource (as is typical of the resource being retrieved from the Internet), the URL moniker sets the "fFullyAvailable" argument to FALSE.

As explained above in the description of the IPersistMoniker::Load function, the object 208 responds to this call to its IPersistMoniker::Load function by, in turn, calling the URL Moniker's BindToStorage function and specifying the object's preferred IPersistxxx interface. An exception is where the fFullyAvailable argument is set to FALSE (indicating the resource is not yet retrieved) and the object 208 cannot load the resource as its persistent state while the resource is still being retrieved. In such a case, the object 208 returns the value "S_FALSE," which causes the URL moniker to wait and call the IPersistMoniker::Load function on the Object 208 after retrieving the resource is completed. In this second call to the IPersistMoniker::Load function, the URL moniker can then set the fFullyAvailable argument to TRUE, and the object 208 can respond by calling the URL moniker's BindToStorage function while specifying its preferred IPersistxxx interface.

Otherwise, if the object 208 supports the IPersistStream interface, the URL moniker calls the object's IPersistStream::Load function, and passes as a parameter of the call the IStream object which is being filled with the data of the resource that the transport object 210 is downloading asynchronously from the Internet. This causes the object 208 to load its state from the resource that the transport object is asynchronously downloading. If the object 208 is of an asynchronously aware class (i.e., the CLSID of the object's class is marked in the system registry with the category CATID_AsyncAware), the object can access the resource's data from the IStream as it is downloaded by the transport object 210 from the Internet with the IStream::Read and IStream::Write functions. If the object's class is not in the asynchronously aware category, calls to the IStream::Read or IStream::Write function which reference data that is not yet available block until the data becomes available. If the object's class is marked with the category CATID_AsyncAware, then calls to the IStream::Read or IStream::Write function which reference data not yet available return the value, E_PENDING.

Finally, if the IPersistFile interface is the highest IPersistxxx interface supported by the object, the URL moniker 200 completes the download of the resource's data into a temporary file. The URL moniker 200 then calls the load function on the object's IPersistFile interface. In the illustrated embodiment, the temporary file is cached along with other Internet-downloaded data, so the client must be sure not to delete the file.

When the object 208 returns from one of the various IPersistXXX::Load calls above at steps 265, 267 and 269, the URL moniker 200 queries the object using the IUnknown::QueryInterface function at step 270 for an interface pointer that the client 202 originally requested in the client's call to the URL moniker's IMoniker::BindToObject function. Finally, at step 271, the URL moniker 200 returns this interface pointer to the client using the client's IBindStatusCallBack::OnObjectAvailable function.

6.2.8 The URL Moniker-IMoniker::BindToStorage Function

The client 202 calls the BindToStorage function to cause the URL moniker 200 to download the named resource into the secondary storage 42 of the computer 20 (FIG. 1). The implementation of the BindToStorage function in the illustrated URL moniker 200 is similar to the BindToObject function (i.e., having the operation shown in FIGS. 8A and 8B) except that, rather than instantiating the data of the resource designated by the URL moniker as an object of a class associated with the resource (as shown at steps 260–269 of FIG. 8B), the URL moniker provides the resource's data to the client as a storage object. More specifically, in its call to the BindToStorage function, the client 202 can specify the IStream, IStorage, or IUnknown interfaces (which are each well known OLE interfaces described in *Inside OLE, Second Edition,* supra). If the IStream interface is requested, the URL moniker 200 provides the downloaded data to the client 202 as an object ("IStream object") which supports the IStream interface. If the IStorage interface is requested and the resource named by the URL moniker is an OLE compound file (a well known OLE file format described in *Inside OLE, Second Edition,* supra), the URL moniker 200 provides the downloaded data to the client 202 as an IStorage object (i.e., an object supporting the IStorage interface). Otherwise, if IUnknown is requested, the downloaded data is provided as a file. The IStream or IStorage interface requested by the client 202 is passed to the client via the IBindStatusCallback::OnDataAvailable function (in place of the step 271 of FIG. 8B in the BindToObject function).

According to well known OLE conventions, if the client 202 needs access to the storage object outside the scope of the IBindStatusCallback::OnDataAvailable function, then the client must call the AddRef function of the object whose IUnknown interface pointer is passed in the punkForRelease field of the STGMEDIUM structure, which also contains the storage object. As indicated above, the storage object can be an IStream or IStorage object, or it can be a name of a file in the file system. If the storage object is an IStream or IStorage object then the client must also call the AddRef function on the storage object. After finishing with the storage object, the client must call the Release function on the object whose interface is passed in the punkForRelease field. In addition, the client must call Release on the IStream or IStorage object if one were avaliable. If the storage object happens to be a file system file, then the client must free the memory allocated for the filename. The client must not delete the file. The ownership of the file is with the object whose IUnknown interface pointer is the one which is used for punkForRelease.

As with the BindToObject function, the client 202 can specify synchronous or asynchronous operation with the BindToStorage function by setting the BINDF_ASYNCHRONOUS flag in the bind information returned when the URL moniker 200 calls the client's IBindStatusCallback::GetBindInfo function. For synchronous operation, the BindToStorage function blocks execution of the client 202 during downloading of the resource designated by the URL moniker 200. For asynchronous operation, the URL moniker 200 returns immediately from the BindToStorage function, and the client 202 is not blocked.

In cases where the data is provided as the IStream or IStorage objects, the client 202 can further request asynchronous storage operation by setting the BINDF_ASYNCSTORAGE flag in the bind information returned from the client's IBindStatusCallback::GetBindInfo function. When asynchronous storage is requested, the IStream or IStorage object provided by the URL moniker 200 allows the client 202 to access the data as it is downloaded. When the client 202 call the Read function on the IStream or IStorage interface, the IStream or IStorage object returns the data if available, or returns the value E_PENDING if not yet available. Otherwise, if asynchronous storage is not requested, the IStream or IStorage object provided by the URL moniker 200 blocks the client 202 when the client calls the Read function on the object.

6.2.9 The URL Moniker-IMoniker::Reduce Function

In the illustrated URL moniker 200, this function returns a value, MK_S_REDUCED_TO_SELF, and a pointer to itself (i.e., the pointer, "this") as its output parameter, *ppmkReduced.

6.2.10 The URL Moniker-IMoniker::ComposeWith Function

The illustrated URL moniker 200 supports composition via this function. More specifically, the URL moniker 200 composes itself together with a relative moniker (a moniker that names a resource relative to that named by the URL moniker) to form a resulting moniker whose encapsulated name is a composite of those of the URL and relative monikers. The function parses the name held by the relative moniker which is specified as an argument to the function according to the RFC syntax rules, and creates an appropriate moniker to hold the composite name according to the type of the relative moniker. For example, if the relative moniker is a file moniker (a well known type of OLE moniker) which names a file relative to a base URL specified by the URL moniker (e.g., the file is stored in a directory specified by the URL on a server), the function composes the base URL plus the file name into a composite URL and creates a URL moniker to hold the composite URL. On the other hand, if the relative moniker is an item moniker (another well known type of OLE moniker) which names an embedded item relative to the base URL of the URL moniker (e.g., the item names an Excel spreadsheet embedded in a Word document whose location on the Internet is specified by the base URL), the function creates a generic composite moniker (also a well known type of OLE moniker) to name the item.

The caller of this function can set the fOnlyIfNotGeneric argument to TRUE to cause the function not to return a generic composite moniker. If the function's fOnlyIfNotGeneric flag is set to TRUE and the composition will result in a composite moniker, the function returns the value, MK_E_NEEDGENERIC.

6.2.11 The URL Moniker-IMoniker::Enum Function

This function returns the value, S_OK, and sets its "*ppenumMoniker" output parameter to NULL, indicating that the URL moniker 200 does not contain sub-monikers.

6.2.12 The URL Moniker-IMoniker::IsEqual Function

This function checks another moniker specified in its pmkOtherMoniker parameter is equivalent to the URL moniker 200, meaning the other moniker also is of the URL moniker class and has a same display name (i.e., the URL string designated by the URL moniker 200). The function checks whether the other moniker's CLSID (obtained via the IPersist::GetClassID function) is CLSID_URLMoniker, and also compares the display names of the URL moniker 200 and the other moniker for equality. If the other moniker is equivalent to the URL moniker, the function returns S_OK. If not, the function returns S_FALSE.

6.2.13 The URL Moniker-IMoniker::Hash Function

This function creates a hash value based on the URL designated by the URL moniker 200. The function typically is used to speed up comparisons by reducing the number of times that it is necessary to call the IsEqual function.

6.2.14 The URL Moniker-IMoniker::IsRunning Function

This function returns S_OK if the URL moniker 200 is currently "running", otherwise returns S_FALSE. The implementation of the function in the illustrated URL moniker 200 determines if the URL moniker is running by first checking whether the URL moniker is equal to the newly running moniker (i.e., by calling pmkNewlyRunning->IsEqual(this)), and next by checking whether the URL moniker 200 is registered with the Running Object Table of the bind context 156.

6.2.15 The URL Moniker-IMoniker::GetTimeOfLastChange Function

This function returns the time of last change of an object that is registered in the running object table of the bind context 156.

6.2.16 The URL Moniker-IMoniker::Inverse Function

This function returns the value, MK_E_NOINVERSE.

6.2.17 The URL Moniker-IMoniker::CommonPrefixWith Function

This function computes a common prefix of the URL moniker 200 and a specified other URL moniker.

6.2.18 The URL Moniker-IMoniker::RelativePathTo Function

This function computes a relative path between the URL moniker 200 and a specified other URL moniker.

6.2.19 The URL Moniker-IMoniker::GetDisplayName Function

This function returns the URL string designated by the URL moniker 200. The function returns the full URL string if the URL moniker designates a full URL string. If the moniker was created with a partial URL string (as described above for the CreateURLMoniker), the function attempts to find an URL moniker which designates a base context of the URL moniker 200. The function 200 first checks in the bind context 156 under the data member, SZ_URLCONTEXT, and next checks to the left of the URL moniker if the URL moniker is part of a compound moniker. If the function does not find a base context, the function returns the partial URL string designated by the URL moniker 200.

6.2.20 The URL Moniker-IMoniker::ParseDisplayName Function

This function parses a full or partial URL string (which is input as parameter, szDisplayName) to create a resulting URL moniker (which is output as paramter, ppmkOut). If the szDisplayName parameter represents a full URL string (e.g., "http://foo.com/default.html"), the function creates a new full URL moniker which designates the full URL string. If the szDisplayName parameter represents a partial URL string (e.g., "..\default.html"), the function creates a new full URL moniker which designates a full URL string formed by combining the parameter with a base context from either the SZ_URLCONTEXT object-parameter of the bind context 156 or from the URL moniker 200. For example, if the context moniker is "http://foo.com/pub/list.html" and szDisplayName is "..\default.html," the resulting URL moniker would represent "http://foo.com/default.html." The function is used by the MkParseDisplayName (described in the Moniker Overview section above) and MkParseDisplayNameEx (described below) API functions.

6.2.21 The URL Moniker-IMoniker::IsSystemMoniker Function

This function returns the value, S_TRUE, and outputs the value, MKSYS_URLMONIKER, as its output parameter, *pdwMksys.

6.3 Client Extension Services

In some cases, the bind operation with the URL moniker 200 requires additional services from the client 202 in order to complete negotiations necessary for downloading the resource designated by the URL moniker from the Internet. The illustrated client 202 supports an IAuthenticate interface 230 and an IHttpNegotiate interface 232 which expose services for authentication and HTTP negotiations. The URL moniker 200 requests pointers to these interfaces using the IBindStatusCallback::QueryInterface function.

6.4 The IAuthenticate Interface

The illustrated client 202 supports the IAuthenticate interface 230 to provide a service, the authentication function, which the URL moniker 200 calls to retrieve information needed for authentication during a download. The illustrated IAuthenticate interface is defined as follows:

```
//+------------------------------------------------------------
//
// Copyright © Microsoft Corporation, 1995–1996.
//
// Contents:   IAuthenticate interface definition
//
//-------------------------------------------------------------
cpp_quote("#ifndef _LPAUTHENTICATION_DEFINED")
cpp_quote("#define _LPAUTHENTICATION_DEFINED")

[
   local,
   object,
   uuid(79eac9d0-baf9-11ce-8c82-00aa004ba90b),
   pointer_default(unique)
]

interface IAuthenticate : IUnknown
{
   typedef [unique] IAuthenticate *LPAUTHENTICATION;

HRESULT Authenticate(
      [out] HWND* phwnd,
      [out] LPWSTR *pszUsername,
      [out] LPWSTR *pszPassword
      );
}
cpp_quote("#endif")
```

The Authenticate member function of this interface is called by the URL moniker 200 when it needs basic authentication information from the client 202. In response, the client 202 can return a user name and a password strings to the URL moniker 200. Alternatively, the client can provide a window handle, HWND, of a window that is used to present a default authentication user interface. The URL moniker 200 uses the authentication user interface to obtain authentication information (i.e., the user name and password) from the user. The parameters and return values of the illustrated Authenticate function are shown in the following table.

TABLE 35

The IAuthenticate::Authenticate
Function Parameters and Return Values.

| Argument | Type | Description |
|---|---|---|
| phwnd | HWND * | Client-provided HWND of the parent window for default authentication UI. If no UI is desired, the client must provide a user name and password in the other parameters, and this handle is set to the value −1. |
| szUsername | LPWSTR | Client-provided user name for authentication. If the client returns a value here it should also set *phwnd = −1. |
| szPassword | LPWSTR | Client-provided password for authentication. If the client returns a value here it should also set *phwnd = −1. |
| Returns | S_OK | Success. |
|  | E_INVALIDARG | One or more arguments are invalid. |

6.5 The IHttpNegotiate Interface

The URL moniker 200 utilizes the services provided by the illustrated client 200 through the IHttpNegotiate interface 232 to allow the client to negotiate HTTP download parameters. The IHttpNegotiate interface 232 is defined as follows:

```
//+------------------------------------------------------------
//
// Copyright © Microsoft Corporation, 1995–1996.
//
// Contents:   IHttpNegotiate interface definition
//
//-------------------------------------------------------------
cpp_quote("#ifndef _LPHTTPNEGOTIATE_DEFINED")
cpp_quote("#define _LPHTTPNEGOTIATE_DEFINED")

[
   object,
   uuid(79eac9d2-baf9-11ce-8c82-00aa004ba90b),
   pointer_default(unique)
]

interface IHttpNegotiate : IUnknown
{
   typedef [unique] IHttpNegotiate *LPHTTPNEGOTIATE;

HRESULT BeginningTransaction(
      [in]          LPCWSTR szURL,
      [in, unique]  LPCWSTR szHeaders,
      [in]          DWORD dwReserved,
      [out]         LPWSTR *pszAdditionalHeaders);

HRESULT OnResponse(
      [in]          DWORD dwResponseCode,
      [in, unique]  LPCWSTR szResponseHeaders,
      [in, unique]  LPCWSTR szRequestHeaders,
      [out]         LPWSTR *pszAdditionalRequestHeaders);
}
cpp_quote("#endif")
```

6.5.1 The IHttpNegotiate::BeginningTransaction Function

The URL moniker 200 calls this function before sending an HTTP request for downloading the resource designated by the URL moniker. In the URL moniker's call to this function, the URL moniker notifies the client of the URL of the resource which is to be downloaded in the HTTP request. The URL moniker 200 also allows the client 202 to add additional headers to the HTTP request. The illustrated IHttpNegotiate::BeginningTransaction function has the parameters and return values shown in the following table.

TABLE 36

IHttpNegotiate::BeginningTransaction
Function Parameters and Return Values

| Argument | Type | Description |
|---|---|---|
| szURL | LPCWSTR | The URL for the HTTP transaction. |
| dwReserved | DWORD | Reserved for future use. |
| szHeaders | LPCWSTR | The current request headers. |
| szAdditionalHeaders | LPWSTR | Additional headers to append to the HTTP request header. |
| Returns | S_OK | Success, append the headers. |
|  | S_FALSE | Do not append any headers. |
|  | E_INVALIDARG | The argument is invalid. |
|  | E_ABORT | Abort the HTTP transaction. |

6.5.2 The IHttpNegotiate::OnHeadersAvailable Function

This function is called by the URL moniker 200 to provide the client with the HTTP response header information used in downloading the resource designated by the URL moniker. In the function, the client 202 may examine these headers and choose to abort the HTTP transaction. The illustrated IHttpNegotiate::OnHeadersAvailable function's parameters and return values are shown in the following table.

TABLE 37

IHttpNegotiate::OnHeadersAvailable
Function Parameters and Return Values

| Argument | Type | Description |
|---|---|---|
| dwResponseCode | DWORD | HTTP response code. |
| szHeaders | LPCWSTR | The response headers (a NULL-terminated string). |
| Returns | S_OK | Success. Continue the HTTP transaction. |
|  | E_INVALIDARG | The argument is invalid. |
|  | E_ABORT | Abort the HTTP transaction. |

6.5.3 The IHttpNegotiate::OnError Function

The URL moniker 200 calls this function when an HTTP error occurs that cannot be resolved. The function allow the client 202 to add HTTP headers that are used to respond to the error. The function's parameters and return values are shown in the following table.

TABLE 38

IHttpNegotiate::OnError Function Parameters and Return Values

| Argument | Type | Description |
|---|---|---|
| dwResponseCode | DWORD | HTTP response code. |
| szRequestHeaders | LPCWSTR | HTTP headers sent to the HTTP server. |
| szResponseHeader | LPCWSTR | Response headers from the HTTP server. |
| szAdditionalRequestHeaders | LPWSTR | Headers to add to the request headers before resending. |
| Returns | S_OK | Success, append the headers to the request. |

TABLE 38-continued

IHttpNegotiate::OnError Function Parameters and Return Values

| Argument | Type | Description |
|---|---|---|
|  | S_FALSE | Do not append any headers. |
|  | E_INVALIDARG | The argument is invalid. |
|  | E_ABORT | Abort the HTTP transaction. |

6.6 Display Name Parsing

Figure 7:
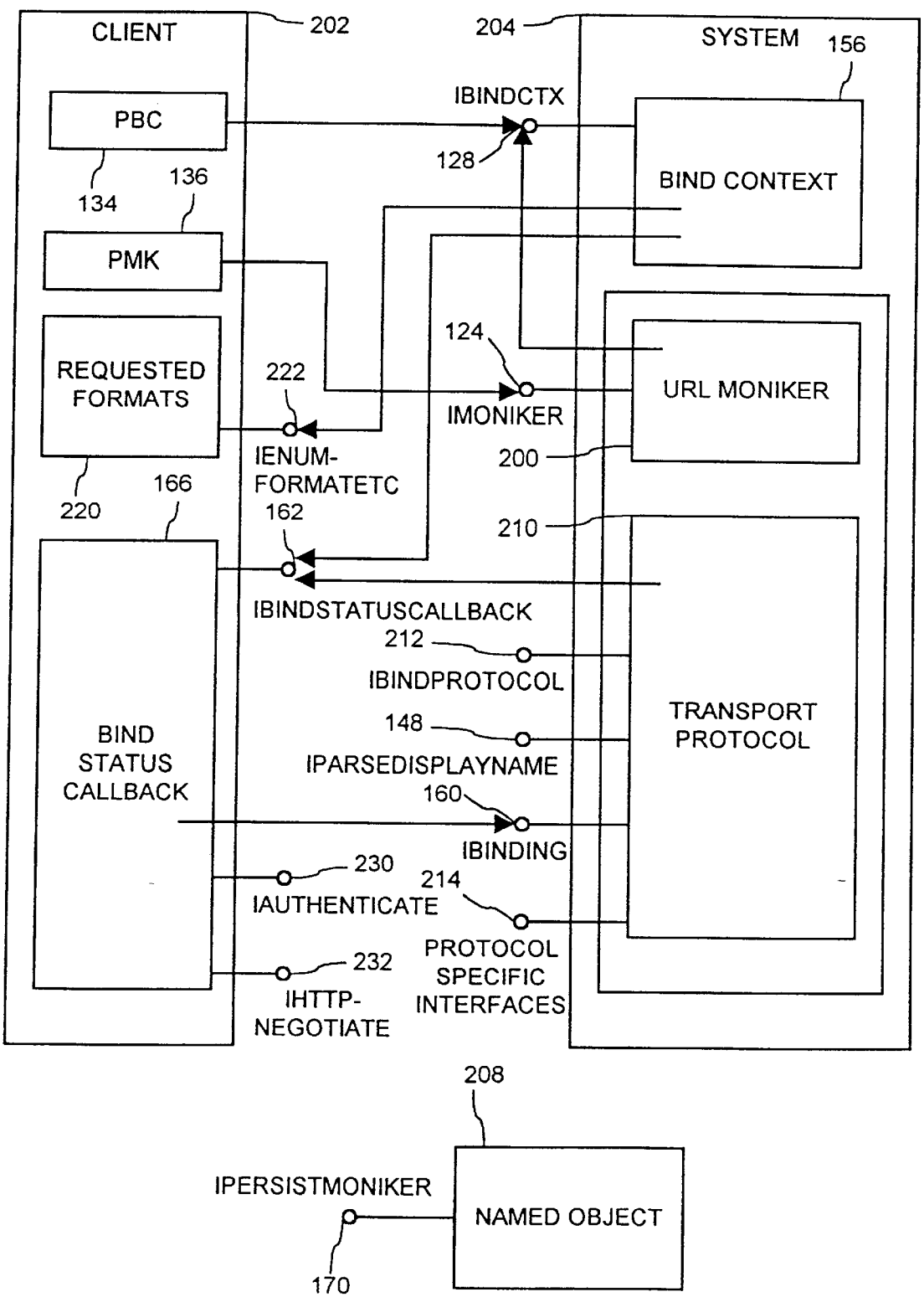
FIG. 7 is a block diagram of software components including a URL moniker for unified browsing in the computer of FIG. 1 of documents referenced by a URL from the Internet according to another illustrated embodiment of the invention.

With reference still to FIG. 7, the illustrated system 204 extends parsing of display names into monikers to also support the Universal Resource Indicator (URI) syntax, which is used for Internet URLs. The URI syntax specifies that a string begins with a transport protocol identifier followed by a colon character (e.g., "http:" for the Hypertext Transport Protocol, "ftp:" for the File Transport Protocol, etc.). A sub-string following the transport protocol prefix designates a resource and its site. The URI syntax is described in the IETF RFC1630 specification, which is available from the Internet at "http://ds.internic.net/rfc/rfc1590.txt."

For parsing URI syntax display names, the illustrated system 204 provides a MkParseDisplayNameEx API function. Similar to the MkParseDisplayName API function described in the Moniker Overview section above, this API function is called by the client 202 to obtain a moniker that references data identified by a text string (referred to herein as the "display name" of the data). This is referred to herein as "parsing" the display name.

In an initial step of the parsing process, the MkParseDisplayNameEx API function parses a first portion of the display name and creates an initial moniker appropriate to that portion. For parsing with the MkParseDisplayNameEx API function, the display name is allowed to begin in one of three ways: with a programmatic identifier ("ProgID") followed by a colon character (":"), with a valid file system name, or with the '@' character followed by a ProgID. A ProgID is a short text string used in the Windows® operating system registry to uniquely identify classes of objects installed on the computer system. The ProgID follows a syntax that the string: (1) have no more than 39 characters, (2) contain no punctuation (including underscore), except that it may contain one or more periods, (3) not start with a digit, and (4) differ from any OLE version 1 class name. Programmatic identifiers are described, inter alia, in *OLE 2 Programmer's Reference, Volume One*, Microsoft Press, 1994.

The MkParseDisplayNameEx API function creates the initial moniker by attempting each of the following strategies in order.

"ProgID:" Case. If a prefix of the display name in the szDisplayName parameter conforms to legal ProgID syntax, is longer than a single character, and is followed by a colon character (':'), the API function converts the ProgID to a CLSID using the CLSIDFromProgID API function (a well known Windows® operating system API function). The MkParseDisplayNameEx API function then calls the CoCreateInstance API function (described in the Document Object and Server Overview section above) to create an object of the class identified by the CLSID (which is the initial moniker), and obtains an interface pointer to the IParseDisplayName Interface on the initial moniker.

Running Object Table Case. If a prefix of the display name is a valid file name, the MkParseDisplayNameEx API consults the running objects table for a file moniker that references the file name. If there is a running file moniker that references the display name prefix, the MkParseDisplayNameEx API treats the file moniker as the initial moniker.

File System Case. The MkParseDisplayNameEx API function consults the file system of the computer 20 (FIG. 1) to check whether a prefix of the display name matches any existing file in the file system. The MkParseDisplayNameEx API function then creates a file moniker (as described in the Moniker Overview section above) which references this file as its initial moniker.

"@ProgID" Case. If the initial character of the display name is the '@' character, the MkParseDisplayNameEx API function converts a portion of the display name following the '@' character which conforms to the ProgID syntax into a CLSID using the CLSIDFromProgID API function. The MkParseDisplayNameEx API function then creates a instance of the class identified by the CLSID (which is the initial moniker).

The MkParseDisplayNameEx API function then iteratively calls the IParseDisplayName::ParseDisplayName function of the moniker it has created thus far (the "current" moniker), passing a suffix portion of the display name which remains to be parsed (the "current" portion) in the call. The ParseDisplayName function parses this remaining portion of the display name into a new moniker, and returns the new moniker with a new suffix portion of the display name that remains to be parsed. The returned moniker and display name portion become the current moniker and current portion in the next iteration of this step. The iterations end when the display name is fully parsed, an error occurs, or the remaining suffix of the display name cannot be parsed. As a result of the iterative parsing, the MkParseDisplayNameEx API function creates a succesion of increasingly more specific monikers which it combines into a composite moniker. Each successive moniker is able to parse a next more specific portion of the display name into a moniker. For example, a display name can be parsed by the API function into a composite moniker which includes a file moniker that references a file designated in the display name, and an item moniker that references a part of the file designated in a further portion of the display name.

The MkParseDisplayNameEx API function supports the URI syntax in an extensible fashion with the "ProgID:" case strategy for parsing the display name prefix to an initial moniker. In the illustrated embodiment, the display name prefixes that designate Internet transport protocols (e.g., "http:," "ftp:," and "gopher:") are registered as ProgIDs in the system registry which map to a CLSID for the URL moniker. Thus, when the MkParseDisplayNameEx API function is called to parse an URL, the MkParseDisplayNameEx API function creates a URL moniker in its initial parsing step, and calls the URL moniker's IParseDisplayName::ParseDisplayName function to parse the remainder of the URL. Likewise, the MkParseDisplayNameEx API function can be extended to parse display names with new transport protocols by registering the protocol identifier as a ProgID in the system registery that maps to a handler moniker, and implementing a ParseDislayName function in the handler moniker to parse display names using the protocol.

The MkParseDisplayNameEx API function is defined as shown in the following C programming language statement, and has the parameters and return values shown in the following table 39.

HRESULT MkParseDisplayNameEx([in] IBindCtx* pbc, [in]LPWSTR szDisplayName, [out] ULONG*pcchEaten, [out] IMoniker** ppmk);

TABLE 39

MkParseDisplayNameEx API Function Parameters and Return Values

| Argument | Type | Description |
| --- | --- | --- |
| pbc | IBindCtx* | The binding context in which to accumulate bound objects. |
| szDisplayName | LPCWSTR | The display name to be parsed. |
| pcchEaten | ULONG* | On exit the number of characters of the display name that was successfully parsed. Most useful on syntax error, when a non-zero value is often returned and therefore a subsequent call to MkParseDisplayNameEx with the same pbc and a shortened szDisplayName should return a valid moniker. |
| ppmk | IMoniker** | Location to return a moniker if successful. |
| Returns | S_OK | Success. |
| | MK_E_SYNTAX | Parsing failed because szDisplayName could only be partially resolved into a moniker. In this case, *pcchEaten holds the number of characters that were successfully resolved into a moniker prefix. |
| | E_OUTOF MEMORY | Out of memory. |

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. An object-oriented framework for providing asynchronous retrieval of data from a storage site for a client, wherein the client comprises plural instructions for executing, the object-oriented framework comprising:
   a naming object having a reference to the data; and
   a binding function callable from the client to initiate asynchronous retrieval of the data from the storage site, the client continuing instruction execution independently of the retrieval of the data from the storage site.

2. The object-oriented framework of claim 1 comprising:
   a bind context object for the client to register a call back interface callable from the naming object, wherein the call back interface exposes one or more functions supported by the client for the naming object to invoke in order to initiate communication with the client.

3. The object-oriented framework of claim 2 wherein the call back interface exposes a function operable to notify the client about progress of the data retrieval.

4. The object-oriented framework of claim 2 wherein the call back interface exposes a function for the naming object to get parameters relating to the data retrieval from the client, whereby the client controls aspects of the data retrieval.

5. The object-oriented framework of claim 1 wherein the naming object operates in a data pull mode to retrieve the data from the storage site when the client reads the data.

6. The object-oriented framework of claim 1 wherein the naming object operates in a data push mode to retrieve the data from the storage site and notify the client when the data is available for reading.

7. The object-oriented framework of claim 1 comprising:
an asynchronous storage object provided by the naming object for storing the data retrieved from the storage site, and for allowing access by the client to a part of the data already retrieved from the storage site during the data retrieval before the data retrieval is completed.

8. The object-oriented framework of claim 7 wherein the asynchronous storage object has a non-blocking mode in which execution of the client is not blocked when accessing a part of the data not yet retrieved from the storage site, and a blocking mode in which execution of the client is blocked when accessing the part of the data not yet retrieved from the storage site, the asynchronous storage object operating in the blocking or non-blocking mode as set by the client.

9. The object-oriented framework of claim 1 wherein the naming object is operative to perform asynchronous or synchronous data retrieval depending on a flag set by the client.

10. The object-oriented framework of claim 1 comprising:
a function provided by the naming object for the client to interrupt the data retrieval.

11. The object-oriented framework of claim 1 comprising:
a binding interface provided by the naming object and having functions callable from the client to cause the data retrieval to abort, suspend, and resume.

12. The object-oriented framework of claim 1 comprising:
a plurality of other naming objects for retrieving data from storage sites;
the naming object performing the data retrieval according to a priority set by the client relative to data retrievals performed by the other naming objects.

13. The object-oriented framework of claim 1 wherein the reference is a resource identifier of data residing on a remote computer network, the naming object operating to asynchronously retrieve the data for the client from the remote computer network.

14. The object-oriented framework of claim 13 in which the naming object obtains information of any preferred formats for the data from the client, and retrieves the data from the remote computer network in an available one of the preferred data formats.

15. The object-oriented framework of claim 13 in which the naming object performs media type negotiation between the client and the remote computer network of a format in which the naming object retrieves the data.

16. The object-oriented framework of claim 13 comprising:
a bind context object for the client to register an interface provided by the client having a format enumeration function callable from the naming object for the client to request any preferred formats for the data, the naming object operating to retrieve the data in an available one of the preferred formats from the remote computer network.

17. The object-oriented framework of claim 13 comprising:
a bind context object for the client to register an interface provided by the client having an authentication function callable from the naming object for the client to provide authentication of the data retrieval from the remote computer network.

18. The object-oriented framework of claim 13 in which the naming object performs parameter negotiation between the client and the remote computer network of a transport protocol with which the naming object retrieves the data from the remote computer network.

19. The object-oriented framework of claim 13 comprising:
a bind context object for the client to register an interface provided by the client having functions callable from the naming object for the client to negotiate parameters of a transport protocol for retrieving the data from the remote computer network.

20. A method of retrieving data in a computer system, comprising:
providing an interface of a naming object having a reference designating stored data to a client application, wherein the client application comprises plural instructions for executing, the interface exposing a binding function of the naming object operative to perform a binding operation on the stored data; and
on a call from the client application to the binding function, initiating binding the stored data as a background process while returning execution to the client application, the client application continuing instruction execution independently of the binding operation on the stored data.

21. The method of claim 20 comprising receiving a call back interface on the client application, the call back interface exposing at least one function supported by the client application callable from the naming object for sending notifications relating to the binding operation of the stored data from the naming object to the client application.

22. The method of claim 21 comprising:
repeatedly calling a progress notification function of the call back interface during the binding operation to provide an indication of the progress of the binding operation to the client application.

23. The method of claim 21 comprising:
calling a data available notification function of the call back interface to notify the client application at a time before the binding operation is completed that a retrieved part of the stored data is available for the client application to access.

24. The method of claim 21 comprising:
calling a stop binding notification function of the call back interface to notify the client application of a status of the binding operation at ending the binding operation.

25. The method of claim 20 comprising:
passing a binding interface by the naming object to the client application, the binding interface exposing an abort function; and
terminating the binding operation upon a call from the client application to the abort function.

26. The method of claim 20 comprising:
passing a binding interface by the naming object to the client application, the binding interface exposing a suspend function and a resume function;

suspending the binding operation upon a call from the client application to the suspend function; and resuming the binding operation upon a call from the client application to the resume function.

27. The method of claim 20 comprising:

passing a binding interface by the naming object to the client application, the binding interface exposing a priority setting function; and establishing a priority of a thread for executing the binding operation according to a value passed from the client application in a call to the priority setting function.

28. The method of claim 20 comprising:

providing an interface of a bind context object to the client application, the bind context object operative to register a call back interface of the client application, wherein the call back interface exposes functions supported by the client application callable from the naming object to initiate communication with the client application;

receiving the interface of the bind context object in the client application's call to the binding function; and calling functions on the call back interface to provide notifications to the client application relating to the binding operation.

29. The method of claim 20 comprising, in the binding operation:

creating a storage object having an interface which exposes a read function for reading data in the storage object;

passing the interface of the storage object to the client application; and retrieving the stored data into the storage object by the background process, whereby the client application has access to the stored data in the storage object during the binding operation.

30. The method of claim 29 comprising:

returning a retrieval pending error notification to the client application when the client application calls the read function to access the stored data which is not yet retrieved into the storage object.

31. A method of creating a moniker object to retrieve data referenced by a name, the name having a prefix portion indicative of a transport protocol followed by a colon character, the method comprising:

registering a program identifier indicative of the transport protocol in association with a class identifier in a registry database, the class identifier being associated with a server application which supports a class of transport protocol object, objects of said class being operative to communicate using the transport protocol to retrieve named data and having a name parsing function operative to create monikers from names using the transport protocol;

parsing the prefix portion up to the colon character from the name;

searching the program identifiers in the registry for a match to the prefix portion;

on matching the prefix portion to the program identifier indicative indicative of the transport protocol, instantiating a transport protocol object of said class and calling the name parsing function on the name so as to create the moniker object.

32. A storage medium having instructions therein for causing a computer to perform a data retrieval method comprising the steps of:

creating a bind context object for storing information relating to a binding operation;

registering a call back interface supported by a client application with the bind context object, wherein the call back interface exposes functions supported by the client application callable from the naming object to initiate communication with the client application, and wherein the client application comprises plural instructions for executing;

creating a moniker object containing a name that references stored data and having a bind function;

initiating a binding operation in the bind function which executes asynchronously of the client application, the client application continuing instruction execution independently of the binding operation; and providing notifications to the client application relating to the binding operation's status with the call back interface.

33. The storage medium of claim 32 wherein the data retrieval method further comprises:

returning a bind interface from the moniker object to the client application, the bind interface having functions for at least one of aborting, suspending, resuming, and setting an execution priority of the binding operation.

34. The storage medium of claim 32 wherein the step of providing notifications in the method comprises:

repeatedly providing progress notifications during the binding operation to the client application indicative of which proportion of the binding operation is complete.

35. The storage medium of claim 32 wherein the method comprises:

registering information in the bind context of any media types acceptable to the client application for retrieving the stored data; and retrieving the stored data in the binding operation in one of said acceptable media types.

36. In a computer system having at least one computer, a moniker object comprising:

a name element for storing a name that identifies data stored in the computer system;

an interface structure through which a client invokes method elements of the moniker object via synchronous calls that suspend instruction execution of the client pending return from the synchronous calls; and a bind method element invoked by the client through such a synchronous call using the interface structure, the invoked bind method element operating to commence a retrieval operation to retrieve the data identified by the name and to return from said synchronous call during the retrieval operation, the return from said synchronous call permitting continued instruction execution of the client independent of the retrieval operation, whereby the continued instruction execution of the client occurs asynchronously of the retrieval operation.

37. The moniker object of claim 36 in combination with a bind context object for the client to register a call back interface callable from the moniker object, wherein the call back interface exposes one or more functions supported by the client for the moniker object to invoke in order to initiate communication with the client.

38. The moniker object of claim 36 in combination with an asynchronous storage object provided by the moniker object for storing retrieved data, and for allowing access by the client to a part of the retrieved data during the retrieval operation before the retrieval operation is completed.

39. The moniker object of claim 36 further comprising:
a flow control element invoked by the client through such a synchronous call using the interface structure, the invoked flow control element operating to affect the execution of the retrieval operation.

40. The moniker object and bind context object of claim 38 wherein the moniker object obtains information of any preferred data formats from the client, and retrieves the data from a remote computer in the computer system in an available one of the preferred data formats.

41. The object-oriented framework of claim 1 wherein the data retrieval and the client instruction execution occur concurrently.

42. The object-oriented framework of claim 1 wherein the data retrieval occurs as a background process.

43. An object-oriented framework for providing asynchronous retrieval of data from a storage site for a client application program, wherein the client application program includes plural instructions for executing, and wherein the client application program further includes a name that references a named item, the object-oriented framework comprising:
association data defining an association of the name to the named item;
a system object that exposes a programming interface to the client application program, wherein the programming interface includes a retrieval function, wherein the client application program initiates asynchronous retrieval of data for the named item through the retrieval function, and wherein the client application program continues instruction execution independently of the asynchronous retrieval of data.

44. The object-oriented framework of claim 43 wherein the programming interface returns to the client application program a reference to a control interface, and wherein the client application program controls the asynchronous retrieval of data through the control interface.

45. The object-oriented framework of claim 43 wherein the name reflects a hierarchical name space.

46. The object-oriented framework of claim 43 wherein the name indicates a transport protocol, and wherein the initiated asynchronous retrieval of data occurs according to the indicated transport protocol.

47. The object-oriented framework of claim 43 wherein the system object places the asynchronously retrieved data in persistent storage.

48. The object-oriented framework of claim 43 wherein the system object places the asynchronously retrieved data in an object associated with the name.

49. An object-oriented framework for providing asynchronous retrieval of data from a storage site for client application program, wherein the client application program includes plural instructions for executing, and wherein the client application program furthr includes a name that references a named item, the object-oriented framework comprising:
association data defining an association of the name to the named item, wherein the name further indicates a transport protocol for retrieving data for the named item;
a retrieval object that implements the transport protocol indicated by the name, wherein the retrieval object handles asynchronous retrieval of data for the named item at the transport protocol level, and wherein the client application program continues instruction execution independently of the asynchronous retrieval of data.

50. The object-oriented framework of claim 49 wherein the retrieval object exposes control interface that includes one or more functions for controlling the asynchronous retrieval of data.

51. the object-oriented framework of claim 49 wherein a system object encompasses the association data and the retrieval object.

52. The object-oreiented framework of claim 49 wherein computer storage persistently stores the asynchronously retrieved data.

53. The object-oriented framework of claim 49 wherein an object associated with the name encapsulates the asynchronously retrieved data.

54. A method of communicating between a client application program and a system object to asynchronously retrieve data stored in a computer system, the method comprising:
initiating by client application program an asynchronous retrieval operation of stored data for a named item, wherein the asynchronous data retrieval operation executes as a background process, and wherein the client application program continues execution independently of the asynchronous retrieval operation; and
providing a control interface to the client application program, wherein the control interface includes functions for the client application program to call to control the asynchronous retrieval operation.

55. The method of claim 54 further comprising:
on a call from the client application program to an abort function of the control interface, aborting the asynchronous retrieval operation.

56. The method of claim 54 further comprising:
on a call from the client application to a suspend function of the control interface, suspending the asynchronous retrieval operation.

57. The method of claim 54 further comprising:
persistently storing asynchronously retrieved data in computer storage.

58. The method of claim 54 further comprising:
encapsulating asynchronously retrieved data within an object associated with the named item.

59. A method of communicating between a client application program and a system object to asynchronously retrieve data stored in a computer system, wherein the client application program includes a client object, the method comprising:
initiating by a client application program an asynchronous retrieval operation of stored data for a named item, wherein the a synchronous data retrieval operation executes as a background process, and wherein the client application program continues execution independently of the asynchronous retrieval operation; and
providing a callback interface to the system object, wherein the callback interface includes functions for the system object to call to notify the client object of events concerning the asynchronous retrieval operation.

60. The method of claim 59 comprising:
on a call to a completion function of the callback interface, notifying the client object of the completion of the asynchronous retrieval operation.

61. The method of claim 59 further comprising:
on a call to a partial completion function of the callback interface, notifying the client object of the partial completion of the asynchronous retrieval operation.

62. The method of claim 59 further comprising:

placing asynchronously retrieved data in persistent computer storage.

63. The method of claim 59 further comprising:

placing asynchronously retrieved data in an object associated with the named item.

64. An object-oriented framework for providing asynchronous retrieval of data for a named item for a client application program, wherein the client application program includes plural instructions for executing, and wherein the client application program further includes a name that references the named item, the object-oriented framework comprising:

a name parsing interface accessible to the client application program and operating to parse a name passed from the client application program in a request issued by the client application program to the interface, the name parsing interface identifying the type of the name and providing a name-type specific object to the client application program; and the name-type specific system object exposing a programming interface to the client application program wherein the programming interface includes a retrieval function, wherein the client application program initiates asynchronous retrieval of data for the named item through the retrieval function, and wherein the client application program continues instruction execution independently of the asynchronous retrieval of data.

65. The object-oriented framework of claim 64 wherein the name-type specific system object encapsulates name to named item association data.

66. The object-oriented framework of claim 64 wherein the name-type specific system object is a moniker object.

67. An object-oriented framework for providing asynchronous data retrieval for a named item for a client application program, wherein the client application program includes plural instructions for executing, and wherein the client application program further includes a name that references the named item, the object-oriented framework comprising:

a service object that instantiates one or more system objects, wherein the service object is callable from a client applicatino program; and a system object that exposes a programming interface to the client application program, wherein the service object instantiates the system object, wherein the programming interface includes a retrieval function, wherein the client application program initiates asynchronous retrieval of data for the named item through the retrieval function, and wherein the client application program continues instruction execution indenpendently of the asynchronous retrieval of data.

68. The object-oriented framework of claim 67 wherein the service object instantiates a name-type specific system object.

69. A method for encapsulating asynchronously retrieved data within an object for a client application program, wherein the client application program includes plural instructions for executing, the method comprising:

de-referencing a data type to an object type;

instantiating an object of the object type;

asynchronously retrieving the data, wherein the client application program continues instruction execution independently of the asynchronous retrieval of the data; and encapsulating the asynchronously retrieved data within the instantiated object.

* * * * *

UNITED STATES PATENT AND TRADEMARK OFFICE
CERTIFICATE OF CORRECTION

PATENT NO. : 6,401,099 B1
DATED : June 4, 2002
INVENTOR(S) : Koppolu et al.

It is certified that error appears in the above-identified patent and that said Letters Patent is hereby corrected as shown below:

Column 57,
Line 61, "indicative indicative" should read -- indicative --.

Column 59,
Line 54, "program furthr" should read -- program further --.

Column 60,
Line 5, "the object-oriented" should read -- The object-oriented --.
Line 34, "application to" should read -- application program to --.
Line 60, "comprising:" should read -- further comprising: --.

Column 62,
Line 9, "applicatino" should read -- application --.
Lines 17-18, "indenpendently" should read -- independently --.

Signed and Sealed this

Seventh Day of September, 2004

JON W. DUDAS
*Acting Director of the United States Patent and Trademark Office*